United States Patent
Parapari et al.

(10) Patent No.: US 11,084,028 B2
(45) Date of Patent: Aug. 10, 2021

(54) SEMICONDUCTOR PHOTOCATALYST AND PREPARATION METHOD THEREOF

(71) Applicants: Mohammad Haghighi Parapari, Tabriz (IR); Maryam Shabani Mollasaraei, Shaft (IR); Amir Haghighi Parapari, Tabriz (IR)

(72) Inventors: Mohammad Haghighi Parapari, Tabriz (IR); Maryam Shabani Mollasaraei, Shaft (IR); Amir Haghighi Parapari, Tabriz (IR)

( * ) Notice: Subject to any disclaimer, the term of this patent is extended or adjusted under 35 U.S.C. 154(b) by 84 days.

(21) Appl. No.: 16/663,646

(22) Filed: Oct. 25, 2019

(65) Prior Publication Data
US 2020/0156053 A1  May 21, 2020

(51) Int. Cl.
*B01J 35/00* (2006.01)
*B01J 37/34* (2006.01)
*B01J 35/10* (2006.01)
*B01J 23/889* (2006.01)
(Continued)

(52) U.S. Cl.
CPC ......... *B01J 35/004* (2013.01); *B01J 23/8892* (2013.01); *B01J 35/108* (2013.01);
(Continued)

(58) Field of Classification Search
CPC .. B01J 35/004; B01J 23/8892; B01J 23/8437; B01J 35/1019; B01J 35/1042;
(Continued)

(56) References Cited

U.S. PATENT DOCUMENTS 10,888,845 B1 *  1/2021  Asiri ................ C02F 1/30
2011/0124492 A1 *  5/2011  Loukine ........... B01J 35/0013
                                                  502/159
(Continued)

FOREIGN PATENT DOCUMENTS

CN      11 2275301    *  1/2021  ............ B01J 27/051

OTHER PUBLICATIONS

Liang Wang et al., "A dye-sensitized visible light photocatalyst Bi24O31Cl10." Scientific Reports, pp. 1-8. (Year: 2014).*
(Continued)

*Primary Examiner* — Patricia L. Hailey

(57) ABSTRACT

The present invention discloses a novel magnetic BiOCl—$Bi_{24}O_{31}Cl_{10}$/$MnFe_2O_4$—$Fe_2O_3$ semiconductor photocatalyst as a staggered multi-heterojunction nano-photocatalyst for pharmaceutical effluents remediation, and preparation method and use thereof. The semiconductor photocatalysts are at weighted ratios 9:1 4:1, 7:3 and 3:2 of BiOCl—$Bi_{24}O_{31}Cl_{10}$ and $MnFe_2O_4$—$Fe_2O_3$ semiconductor. The BiOCl—$Bi_{24}O_{31}Cl_{10}$/$MnFe_2O_4$—$Fe_2O_3$ semiconductor photocatalyst with 10% $MnFe_2O_4$—$Fe_2O_3$ is a solar light activated photocatalyst for pharmaceutical effluents remediation. The pharmaceutical effluents include ofloxacin antibiotic. The mentioned semiconductor photocatalyst effectively removes the ofloxacin (OFL) antibiotic from polluted aqueous solution under simulated solar light, facilitates separation of photocatalyst from treated aqueous solution using magnetic property, enhances light absorption edge, improves intra-particle mass transfer, increases adsorption capacity and promotes efficient surface reactions, which includes: increasing the light absorption range, increasing quantum efficiency and reducing the recombination phenomenon.

20 Claims, 14 Drawing Sheets

(51) Int. Cl.
*B01J 37/08* (2006.01)
*B01J 37/06* (2006.01)
*B01J 37/00* (2006.01)

(52) U.S. Cl.
CPC ....... *B01J 35/1019* (2013.01); *B01J 35/1042* (2013.01); *B01J 35/1047* (2013.01); *B01J 37/009* (2013.01); *B01J 37/06* (2013.01); *B01J 37/08* (2013.01); *B01J 37/343* (2013.01)

(58) Field of Classification Search
CPC .... B01J 35/1047; B01J 35/108; B01J 37/009; B01J 37/06; B01J 37/08; B01J 37/343
USPC ............................................ 502/5, 324, 338
See application file for complete search history.

(56) References Cited

U.S. PATENT DOCUMENTS

2013/0105397 A1* 5/2013 Shukla ..................... B01J 37/10
 210/663
2016/0059228 A1* 3/2016 Shukla ..................... B01J 49/30
 252/184

OTHER PUBLICATIONS

Xin Zhong et al., "Enhanced photocatalytic degradation of levofloxacin by Fe-doped BiOCl nanosheets under LED light irradiation." Chemical Engineering Journal 383, pp. 1-12 (Year: 2020).*

* cited by examiner

SEMICONDUCTOR PHOTOCATALYST AND PREPARATION METHOD THEREOF

BACKGROUND OF THE INVENTION

Currently, increasing organic pollutants such as pharmaceuticals, personal care products, insecticides and dyes in surface water and the environment have made these types of pollutants as one of the most important and serious challenges of the human society. Amongst the organic matter, pharmaceuticals are highly consumed by both humans and livestock in veterinary treatment. These do not significantly metabolize and are excreted from the body as unchanged or in the form of metabolic products through the urine and discharged into municipal sewage and subsequently entered into the environment.

The most common pharmaceuticals found in the environment are antibiotics, analgesic drugs, chemotherapy drugs and hormones. Worldwide, a wide range of these drugs (as emerging contaminants (ECs)) have been observed in the soil and aquatic environments, indicating their resistance in contrast to commonly used technologies in the wastewater treatment. It is worth noting that the risks and dangers of these pollutants are high even at low concentrations.

Among the pharmaceuticals used, antibiotics, in addition to being resistant, high persistence and creating toxicity in the environment, can destroy the microbial population in the soil and water and also cause the immunity of microorganisms and bacteria. This will lead to their mutations and eventually lead to the production of more resistant strains of bacteria and microbes. Hence, antibiotic-contaminated water and soil have increasingly become a problem in society. Thus, there is an urgent need for the remediation of environment, especially aquatic environments.

There are different strategies to degrade emerging pollutants. One such strategy is photocatalysis. Photocatalysis is recognized as a suitable and clean methodology, environmentally friendly, low-cost, the possibility to use the solar energy for activation, the ability to perform at ambient temperature and pressure and a promising approach to destroy organic pollutants with complex structures, especially antibiotics.

Up to now, more attempts to achieve the active photocatalysts under visible/solar light irradiation have been done. Nevertheless, the design of a nanophotocatalyst with high activity in the sunlight spectrum, facilitating intra-particle mass transfer, increasing surface adsorption phenomenon, improving surface reactions, facilitating the separation of photocatalyst from treated aqueous solution and high physico-chemical stability still is one of the main challenges of photocatalytic process. Hence, the efforts and investigations for gaining the suitable photocatalysts with the enhanced light absorption edge, improved intra-particle mass transfer, increased adsorption capacity, promoted efficient surface reactions and facilitated separation are still continued.

Nowadays, researches on the design of photocatalysts have focused on improving high-activity photocatalysts, such as bismuth oxychlorides, $TiO_2$, and $ZnO$. Because despite their high/suitable activity, the use of them have limited due to the wide band gap, high rate of charge carrier recombination, low surface adsorption, the separation problem and etc. Various approaches have been proposed to improve them.

In the context of the present disclosure, there is a need for a photocatalyst that could effectively remove the ofloxacin (OFL) antibiotic from polluted aqueous solution under simulated solar light. Further, there is a need for a photocatalyst comprising features, including high activity and stability in the sunlight spectrum and with other effective parameters in photocatalytic design, such as easy separation from treated aqueous solution that are the current challenges in the photocatalysis process.

SUMMARY OF THE INVENTION

The present invention relates to a $BiOCl—Bi_{24}O_{31}Cl_{10}/MnFe_2O_4—Fe_2O_3$ semiconductor photocatalyst for pharmaceutical effluents remediation, and preparation method and use thereof.

The $BiOCl—Bi_{24}O_{31}Cl_{10}/MnFe_2O_4—Fe_2O_3$ semiconductor as a staggered multi-heterojunction structure and the solar light activated nano-photocatalyst with considering effective factors from engineering perspective was synthesized via a sono-solvothermal method comprising various steps. To fabricate the $BiOCl—Bi_{24}O_{31}Cl_{10}/MnFe_2O_4—Fe_2O_3$ nano-photocatalysts, a mixed phase of magnetic $MnFe_2O_4—Fe_2O_3$ nanomaterial was fabricated during sono-precipitation, aging combined with ultrasound, reflux and calcination steps.

A $BiOCl—Bi_{24}O_{31}Cl_{10}$ nano-photocatalyst is applied as precursor. Then, various nanocomposites in different weighted percentages of $MnFe_2O_4—Fe_2O_3$ (10 wt %, 20 wt %, 30 wt % and 40 wt %) are synthesized using the sono-solvothermal. The characterization of nanocomposites fabricated and the photocatalytic performance evaluation in the remediation of the synthetic pharmaceutical effluent exhibited that $BiOCl—Bi_{24}O_{31}Cl_{10}$ of 90 wt %/$MnFe_2O_4—Fe_2O_3$ of 10 wt % could effectively remove the ofloxacin (OFL) antibiotic from polluted aqueous solution under simulated solar light and its separation was also carried out due to its magnetic property (99.8% remediation after 180 min (dark+light irradiation) for 15 mg/L ofloxacin with initial pH=3 and catalyst loading=2 g/L).

In one embodiment, the semiconductor photocatalyst preparation method is disclosed. At one step, a mixed phase of $MnFe_2O_4—Fe_2O_3$ is prepared. At another step, the mixed phase of $MnFe_2O_4—Fe_2O_3$ and the $BiOCl—Bi_{24}O_{31}Cl_{10}$ precursor phase are coupled, thereby forming a structure of $BiOCl—Bi_{24}O_{31}Cl_{10}/MnFe_2O_4—Fe_2O_3$ semiconductor photocatalyst. The semiconductor photocatalyst is a solar light activated photocatalyst for pharmaceutical effluents remediation. In one embodiment, the pharmaceutical effluents include ofloxacin antibiotic. In one embodiment, the semiconductor photocatalyst is in a form of composite nanosheets. In one embodiment, the semiconductor photocatalyst is of at least one of the weight ratios of 9:1 4:1, 7:3 or 3:2.

In another embodiment, the semiconductor photocatalyst preparation method is disclosed. At step (a), a mixed phase of $MnFe_2O_4—Fe_2O_3$ is prepared. At step (b) a predefined amount of obtained precursor is dispersed in a solvent using ultrasound waves. At step (c), a predefined amount of mixed phase is dispersed in a mixture obtained at step (b) using ultrasound waves. At step (d), a mixture obtained at step (c) is heated in an autoclave for sono-solvothermal process for forming $BiOCl—Bi_{24}O_{31}Cl_{10}/MnFe_2O_4—Fe_2O_3$ semiconductor photocatalyst.

At step (e), the heated mixture (precipitate formed and solvent) of step (d) is cooled at room temperature. At step (f), a precipitate of step (e) is filtered and washed using deionized water. At step (g), a precipitate of step (f) is dried to obtain $BiOCl—Bi_{24}O_{31}Cl_{10}/MnFe_2O_4—Fe_2O_3$ semiconductor photocatalyst. In one embodiment, the autoclave is a stainless-steel autoclave having a Teflon-liner. In another embodiment, the autoclave is a hydrothermal autoclave. In one embodiment, the solvent is ethylene glycol.

In one embodiment, a process for preparing the mixed phase is disclosed. At step (i), a stoichiometric quantity of Mn $(NO_3)_2.4H_2O$ and Fe $(NO_3)_3.9H_2O$ is dissolved in deionized water. At step (ii), a precipitate agent is added to a mixture of step (i) while subjecting to ultrasonic. At step (iii), the addition of the precipitate agent is continued until pH reaches a range of 11-12 for sono-precipitation. At step (iv), a mixture of step (iii) is subjected to ultrasonic irradiation for aging step. At step (v), a mixture of step (iv) is refluxed. At step (vi), a mixture of step (v) is filtered and washed using deionized water. At step (vii), a mixture of step (vi) is dried. At step (viii), the dried mixture of step (vii) is calcined to form the $MnFe_2O_4$—$Fe_2O_3$. In one embodiment, the precipitate agent is NaOH.

One aspect of the present disclosure is directed to a method of preparing a semiconductor photocatalyst, comprising: preparing a mixed phase of $MnFe_2O_4$—$Fe_2O_3$; and solvothermal process between the mixed phase of $MnFe_2O_4$—$Fe_2O_3$ and $BiOCl$-$Bi_{24}O_{31}Cl_{10}$ precursor, thereby forming a novel structure of $BiOCl$—$Bi_{24}O_{31}Cl_{10}$/$MnFe_2O_4$—$Fe_2O_3$ semiconductor photocatalyst.

Another aspect of the present disclosure is directed to a method of preparing a semiconductor photocatalyst, comprising: preparing a mixed phase of $MnFe_2O_4$—$Fe_2O_3$; and reacting said mixed phase with a $BiOCl$—$Bi_{24}O_{31}Cl_{10}$ precursor phase, to form a staggered multi-heterojunction structure of $BiOCl$—$Bi_{24}O_{31}Cl_{10}$/$MnFe_2O_4$—$Fe_2O_3$ (BOC-MFO) semiconductor photocatalyst.

In one embodiment, a solar light activated photocatalyst for pharmaceutical effluents remediation. In another embodiment, the pharmaceutical effluents include ofloxacin antibiotic. In one embodiment, the semiconductor photocatalyst is in a form of composite nanosheets. In another embodiment, the semiconductor photocatalyst is of at least one of the weight ratios of 9:1, 4:1, 7:3 or 3:2. In one embodiment, the semiconductor photocatalyst is synthesized through sono-solvothermal method. In another embodiment, the first mixed phase is prepared during sono-precipitation, aging combined with ultrasound, reflux and calcination steps.

Another aspect of the present disclosure is directed to a method of preparing a semiconductor photocatalyst, comprising: preparing a mixed phase of $MnFe_2O_4$—$Fe_2O_3$; dispersing a predefined amount of $BiOCl$—$Bi_{24}O_{31}Cl_{10}$ precursor phase in a solvent using ultrasound waves; dispersing a predefined amount of $MnFe_2O_4$—$Fe_2O_3$ mixed phase in a mixture obtained at step (b) using ultrasound waves; heating a mixture obtained in the last step in an autoclave for sono-solvothermal reaction between the $MnFe_2O_4$—$Fe_2O_3$ mixed phase and the $BiOCl$—$Bi_{24}O_{31}Cl_{10}$ precursor phase; cooling the heated mixture (precipitate formed and solvent) of the last step at room temperature; filtering and washing a precipitate of the last step using deionized water; and drying a precipitate of the last step to obtain $BiOCl$—$Bi_{24}O_{31}Cl_{10}$/$MnFe_2O_4$—$Fe_2O_3$ semiconductor photocatalyst.

In one embodiment, the autoclave is a stainless-steel autoclave having a Teflon-liner. In another embodiment, the autoclave is a hydrothermal autoclave. In one embodiment, the solvent is ethylene glycol. In another embodiment, the mixed phase of $MnFe_2O_4$—$Fe_2O_3$ is prepared using a process comprising the steps of: (i) dissolving a stoichiometric quantity of Mn $(NO_3)_2.4H_2O$ and Fe $(NO_3)_3.9H_2O$ in deionized water; (ii) adding a precipitate agent to a mixture of step (i) while subjecting to ultrasonic irradiation; (iii) continuing the addition of the precipitate agent until pH reaches a range of 11-12 for sono-precipitation; (iv) subjecting a mixture of step (iii) to ultrasonic irradiation for aging step; (v) refluxing the mixture of step (iv); (vi) filtering and washing a mixture of step (v) using deionized water; (vii) drying a mixture of step (vi); and (viii) calcining the dried mixture of step (vii) to form the $MnFe_2O_4$—$Fe_2O_3$. In a related embodiment, the precipitate agent is NaOH. In one embodiment, the precipitate agent is 2M NaOH.

In one embodiment, the mixed phase of $MnFe_2O_4$—$Fe_2O_3$ is prepared using a process comprising the steps of: (i) dissolving a stoichiometric quantity of $Mn(NO_3)_2.4H_2O$ and $Fe(NO_3)_3.9H_2O$ in 400 mL deionized water; (ii) adding a precipitate agent to a mixture of step (i) while subjecting to ultrasonic irradiation; (iii) continuing the addition of the precipitate agent until pH reaches a range of 11-12 for sono-precipitation; (iv) subjecting a mixture of step (iii) to ultrasonic irradiation; (v) refluxing a mixture of step (iv); (vi) filtering and washing a mixture of step (v) using deionized water; (vii) drying a mixture of step (vi); and (viii) calcining the dried mixture of step (vii) to form the mixed phase $MnFe_2O_4$—$Fe_2O_3$ as intra-heterojunction.

Another aspect of the present disclosure is directed to a novel $BiOCl$—$Bi_{24}O_{31}Cl_{10}$/$MnFe_2O_4$—$Fe_2O_3$ semiconductor photocatalyst, comprising the weight ratios of 9:1 4:1, 7:3 or 3:2 and high activity for $BiOCl$—$Bi_{24}O_{31}Cl_{10}$/$MnFe_2O_4$—$Fe_2O_3$ semiconductor photocatalyst for weight ratio of 9:1 as a staggered multi-heterojunction structure.

In one embodiment, the mixed phase of $MnFe_2O_4$—$Fe_2O_3$ is prepared during sono-precipitation, aging combined with ultrasound, reflux and calcination steps, respectively. In another embodiment, the ultrasound conditions for sono-precipitation step are: power=200 W; temperature=50-70° C.; and using probe typed ultrasound with frequency at about 20 kHz. In one embodiment, the reflux conditions are: temperature=100° C.; and time=2 hours. In one embodiment, the calcination conditions are: temperature=1000° C.; and time=5 hours.

In another embodiment of the present disclosure, the method includes the BOC-MFO nanocomposites being prepared using a process comprising the steps of: (i) regarding the weighed ratios of BOC to MFO, the certain amount of BOC precursor was well sonicated in the solvent at the specified power and time; (ii) the appropriate value of as-prepared MFO was added to the above suspended mixture with ultrasound assisted dispersion; (iii) the transfer of the obtained mixture into a Teflon-lined stainless steel autoclave reactor and solvo-thermally heated at the specified temperature and time; and (iv) after natural cooling to the ambient temperature, the precipitate was filtrated, washed by deionized water for several times and dried in an oven at 110° C. for 12 hours. In one embodiment, the wherein step (i) of condition of the preceding sentence includes that the amount of solvent=70 mL; power of sonication=200 W; time of sonication=30 minutes; temperature=25° C.; and using probe typed ultrasound with frequency at about 20 kHz. In another embodiment, in step (ii), power of sonication=200 W; time of sonication=1 hour; temperature=25° C.; and using probe typed ultrasound with frequency at about 20 kHz. In another embodiment, in step (iii), the conditions are: temperature=150° C.; and time=12 hours.

In another embodiment of the semiconductor photocatalyst, the BET surface area and the total pore volume is more than of 160 $m^2/g$ and 0.5 $cm^3/g$, respectively. In one embodiment, the size distribution of pores is in the range of 2.5-50 nm which has meso-pores into its structure. In another embodiment, the nanosheet morphology, which the average of sheets thickness is at about 19.7 nm. In one embodiment, the semiconductor photocatalyst has 99.8% remediation under the conditions as follow: antibiotic concentration: 15 mg/L; semiconductor dosage: 2 mg/L; pH of solution: 3; and under 120 minutes of simulated solar light irradiation.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

DETAILED DESCRIPTION

Figure 1:
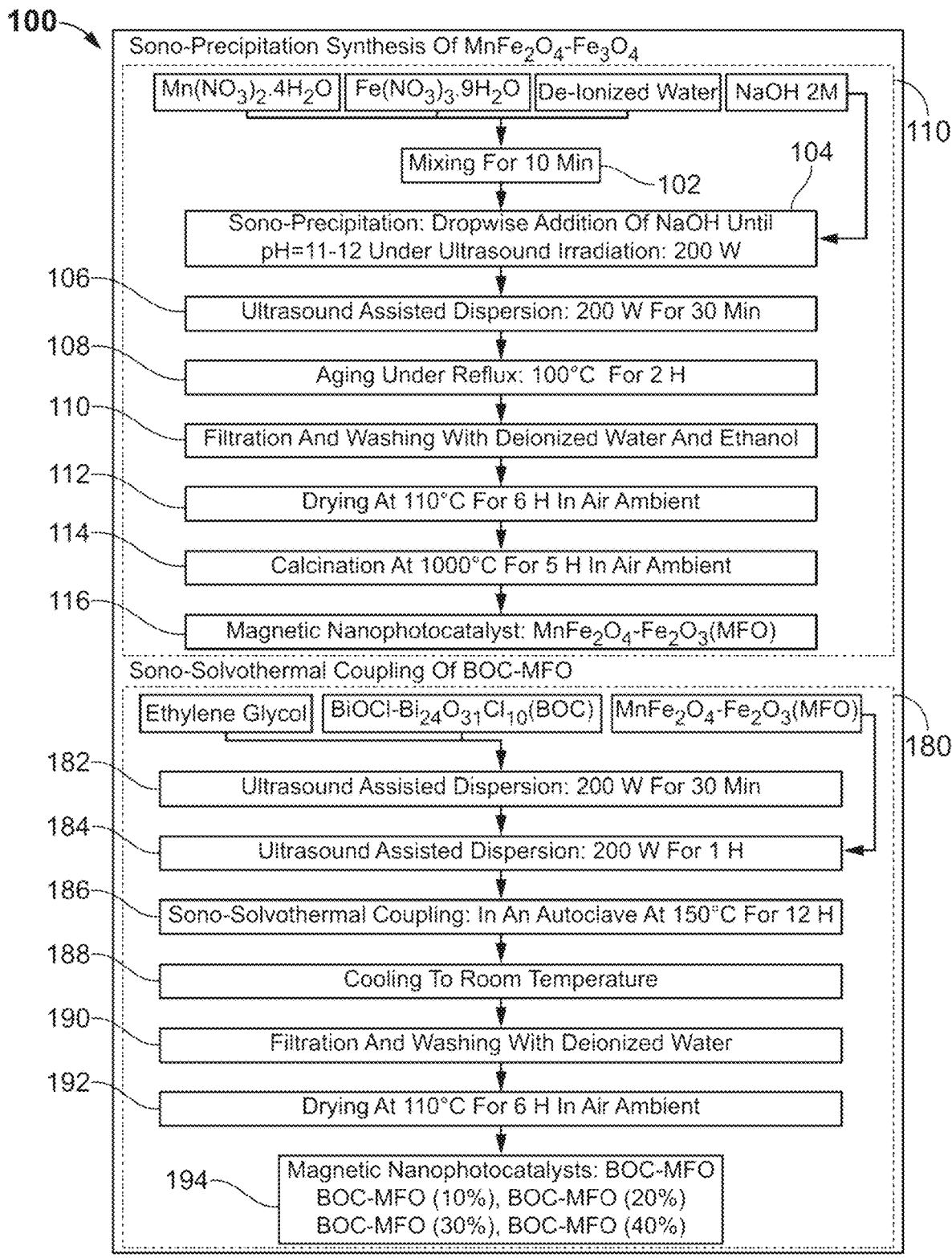
FIG. 1 exemplarily illustrates a flowchart of preparation method of semiconductor photocatalyst, according to an embodiment of the present invention.

The present invention generally relates to a semiconductor photocatalyst and preparation method thereof. More particularly, the present invention relates to a BiOCl—$Bi_{24}O_{31}Cl_{10}$/$MnFe_2O_4$—$Fe_2O_3$ semiconductor as a staggered multi-heterojunction nano-photocatalyst for pharmaceutical effluents remediation, and preparation method and use thereof.

The present disclosure relates to a photocatalyst that could effectively remove the ofloxacin (OFL) antibiotic from polluted aqueous solution under simulated solar light. Further, the disclosure relates to a photocatalyst comprising features, including high activity and stability in the sunlight spectrum; facilitating intra-particle mass transfer (Step 2 of 7 steps in photocatalytic/catalytic processes); increasing surface adsorption phenomenon (Step 3 of 7 steps in photocatalytic/catalytic processes); improving surface reactions namely: increasing the light absorption range, increasing quantum efficiency and reducing the recombination phenomenon (Step 4 of 7 steps in photocatalytic/catalytic processes); facilitating the separation of photocatalyst from treated aqueous solution; and high physico-chemical stability of photocatalyst, leading to more reuse.

In the context of the present disclosure, in present invention, the target is the design and synthesis of the novel magnetic BiOCl—$Bi_{24}O_{31}Cl_{10}$/$MnFe_2O_4$—$Fe_2O_3$ nanocomposite photocatalyst with 10% $MnFe_2O_4$—$Fe_2O_3$ to improve the challenges of BiOCl and BiOCl—$Bi_{24}O_{31}Cl_{10}$. In the structure of the novel magnetic BiOCl—$Bi_{24}O_{31}Cl_{10}$/$MnFe_2O_4$—$Fe_2O_3$ nanocomposite photocatalyst, the staggered band gap was formed between BiOCl—$Bi_{24}O_{31}Cl_{10}$ and $MnFe_2O_4$—$Fe_2O_3$, which $MnFe_2O_4$—$Fe_2O_3$ also is as an intra-heterojunction between $MnFe_2O_4$ and $Fe_2O_3$ that is an important issue. Generally, with design of a photocatalyst as a magnetic BiOCl—$Bi_{24}O_{31}Cl_{10}$/$MnFe_2O_4$—$Fe_2O_3$ nanocomposite photocatalyst, it could cover the challenges as follow: (i) conformation of its high activity in the sunlight spectrum compared to pure BiOCl; (ii) facilitating intra-particle mass transfer (Step 2 of 7 steps in photocatalytic/catalytic processes) compared to pure BiOCl; (iii) increasing surface adsorption phenomenon (Step 3 of 7 steps in photocatalytic/catalytic processes) compared to pure BiOCl and BiOCl—$Bi_{24}O_{31}Cl_{10}$; (iv) improving its surface reactions as increasing the light absorption range, probably increasing quantum efficiency and reducing the recombination phenomenon (Step 4 of 7 steps in photocatalytic/catalytic processes) compared to pure BiOCl and BiOCl—$Bi_{24}O_{31}Cl_{10}$; (v) conformation of its separation facilitation from treated aqueous solution compared to pure BiOCl and BiOCl—$Bi_{24}O_{31}Cl_{10}$; (vi) its good stability after three cycles at pH=3, catalyst loading=2 g/L and pollutant concentration=15 mg/L; and (vii) remediation (adsorption+degradation) obtained: 99.8% in the degradation of a complex and emerging pollutant. So that it can be a more effective perspective to do the future investigation.

A description of embodiments of the present invention will now be given with reference to the figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The present invention discloses a semiconductor photocatalyst and preparation method thereof. The semiconductor photocatalyst comprises a BiOCl—$Bi_{24}O_{31}Cl_{10}$/$MnFe_2O_4$—$Fe_2O_3$ (hereinafter, also referred as BOC-MFO) semiconductor as a staggered multi-heterojunction nano-photocatalyst for pharmaceutical effluents remediation.

Referring to FIG. 1, a flowchart of preparation method 100 of semiconductor photocatalyst is disclosed. The preparation method includes two steps: synthesis of $MnFe_2O_4$—$Fe_2O_3$ (hereinafter, also referred as MFO) during a sono-precipitation, aging combined with ultrasound, reflux and calcination steps, a sono-solvothermal reaction for synthesis of BOC-MFO.

At step 110, a first mixed phase of MFO with intra-heterojunction was prepared using one-pot sono-precipitation, aging combined with ultrasound, reflux and calcination method. This mixed phase is prepared using a process as follows. At step 102, a stoichiometric quantity of $Mn(NO_3)_2.4H_2O$ and $Fe(NO_3)_3.9H_2O$ are dissolved in a 400 mL of deionized water. At step 104, 2M NaOH solution, as precipitate agent, is gradually added to a mixture of step 102 while subjecting to ultrasonic irradiation at power 200 W until and at temperature range between 50-70° C. using probe typed ultrasound with frequency at about 20 kHz. The addition of the precipitate agent is continued until the pH of the mixture reaches the range of 11-12. At step 106 as aging combined with ultrasound, a mixture of step 104 is subjected to ultrasound assisted dispersion at 200W for 30 min and at temperature range between 50-70° C. using probe typed ultrasound with frequency at about 20 kHz. At step 108 as reflux step, the mixture of step 106 is refluxed at 100° C. for 2 hours to form a precipitate. At step 110, the precipitate is filtrated and washed with deionized water and ethanol for several times. At step 112, the washed mixture is dried in an oven at 110° C. for 6 hours. At step 114 as calcination step, the dried mixture is calcined in a furnace (air ambient) at 1000° C. for 5 hours. At step 116, MFO magnetic nano-photocatalyst is obtained.

At step 180, the MFO mixed phase and the BOC precursor phase is reacted. At step 182, a certain amount of BOC is well dispersed in the 70 mL ethylene glycol as solvent using ultrasound waves at the power of 200 W for 30 minutes and at temperature 25° C. using probe typed ultrasound with frequency at about 20 kHz. At step 184, an appropriate quantity of MFO is added to a mixture of step 182 with ultrasound assisted dispersion at the power of 200 W for 1 hour and at temperature 25° C. using probe typed ultrasound with frequency at about 20 kHz. At step 186, a mixture obtained at step 184 in an autoclave at 150° C. for 12 h for sono-solvothermal process. At step 188, the heated mixture (precipitate formed and solvent) is cooled at room temperature to reach ambient temperature. At step 190, the cooled precipitate is filtered and washed using deionized water for several times. At step 192, the precipitate of step 190 is dried in an oven at 110° C. for 12 hours to obtain the semiconductor photocatalyst of $BiOCl-Bi_{24}O_{31}Cl_{10}/MnFe_2O_4-Fe_2O_3$ (BOC-MFO), at step 194. In one embodiment, the weighted percentage of BOC-MFO is 10%. In another embodiment, the weighted percentage of BOC-MFO is 20%. In yet another embodiment, the weighted percentage of BOC-MFO is 30%. In yet another embodiment, the weighted percentage of BOC-MFO is 40%.

The different weighted percentages of BOC-MFO samples are characterized by XRD, FESEM, EDX, BET-BJH, UV-Vis DRS, VSM techniques and pH value at the point of zero charge (pHpzc) to evaluate their photocatalytic performance and determine the optimum sample. The optimum sample is employed in the degradation of ofloxacin (OFL) antibiotic under simulated solar-light to evaluate the influence of various effective factors. In the following, results related to the characterization and rector tests are described.

EXAMPLES

Example 1: XRD Analysis

Figure 2:
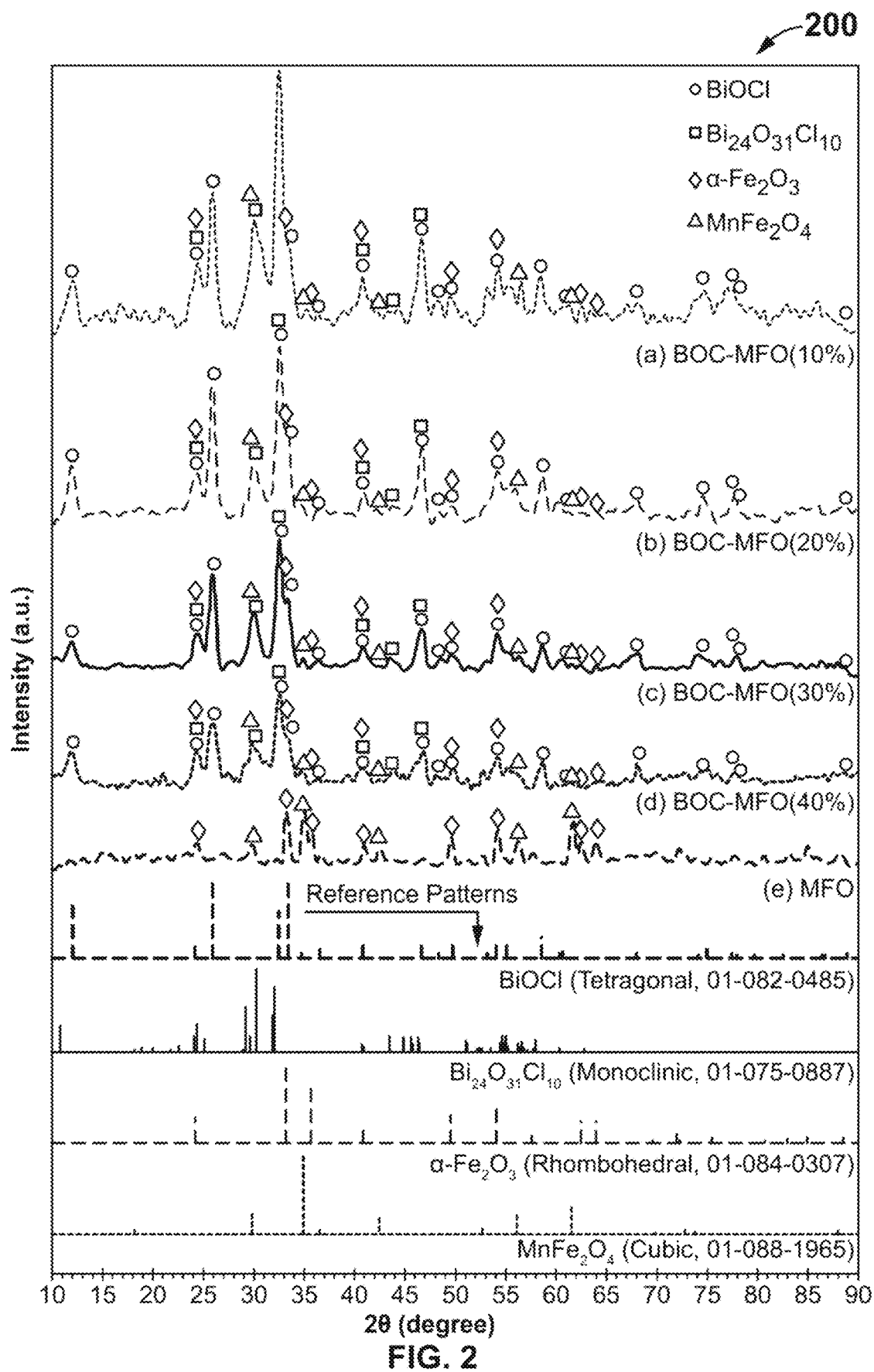
FIG. 2 exemplarily illustrates a graph of X-ray diffraction patterns of $BiOCl—Bi_{24}O_{31}Cl_{10}/MnFe_2O_4—Fe_2O_3$ (BOC-MFO) semiconductor, according to an embodiment of the present invention.
Figure 3A:
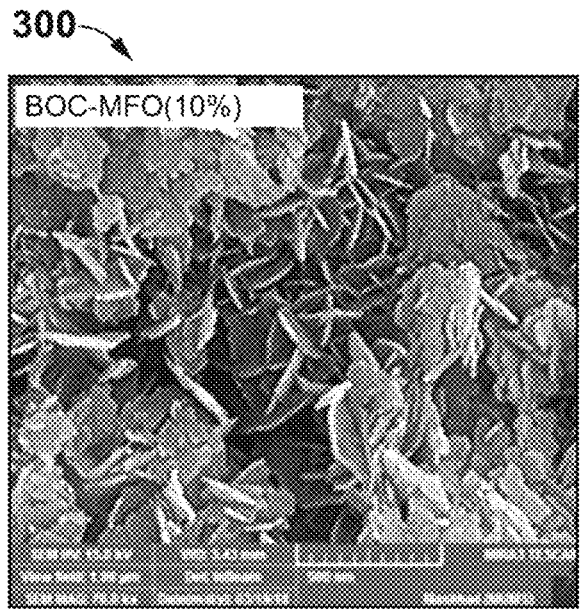
FIG. 3A exemplarily illustrates an image of Field Emission Scanning Electron Microscopy (FESEM) of $BiOCl—Bi_{24}O_{31}Cl_{10}/MnFe_2O_4—Fe_2O_3$ of 10 wt %, according to an embodiment of the present invention.
Figure 3B:
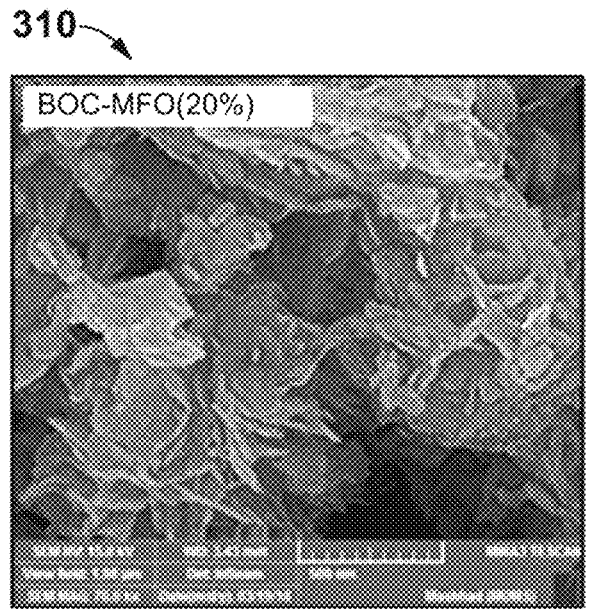
FIG. 3B exemplarily illustrates an image of Field Emission Scanning Electron Microscopy (FESEM) of $BiOCl—Bi_{24}O_{31}Cl_{10}/MnFe_2O_4—Fe_2O_3$ of 20 wt %, according to an embodiment of the present invention.
Figure 3C:
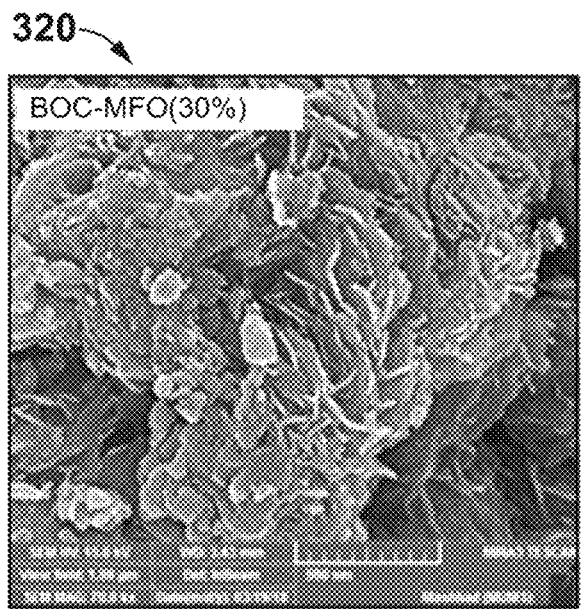
FIG. 3C exemplarily illustrates an image of Field Emission Scanning Electron Microscopy (FESEM) of $BiOCl—Bi_{24}O_{31}Cl_{10}/MnFe_2O_4—Fe_2O_3$ of 30 wt %, according to an embodiment of the present invention.
Figure 3D:
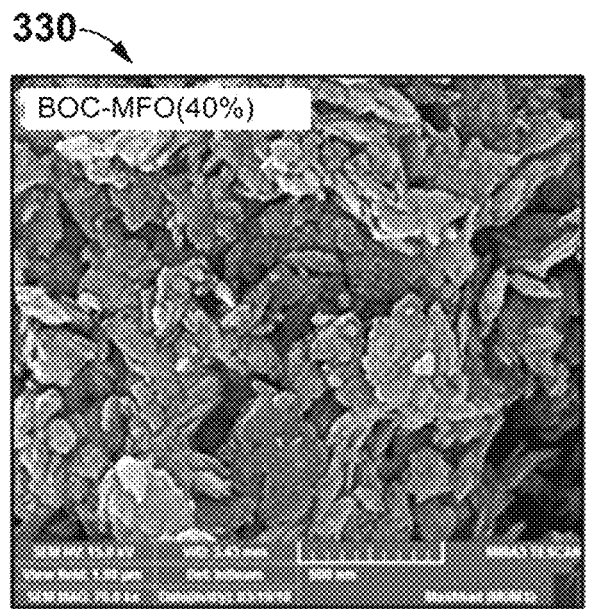
FIG. 3D exemplarily illustrates an image of Field Emission Scanning Electron Microscopy (FESEM) of $BiOCl—Bi_{24}O_{31}Cl_{10}/MnFe_2O_4—Fe_2O_3$ of 40 wt %, according to an embodiment of the present invention.

Referring to FIG. 2, exemplarily illustrates a graph 200 of X-ray diffraction patterns of $BiOCl-Bi_{24}O_{31}Cl_{10}/MnFe_2O_4-Fe_2O_3$ semiconductor is disclosed. Results relevant to the X-ray powder diffraction (XRD) analysis of BOC-MFO of 10 wt %, BOC-MFO of 20 wt %, BOC-MFO of 30 wt % and BOC-MFO of 40 wt % and MFO are illustrated in FIG. 2. For BOC-MFO nanocomposites with various amounts of MFO, the characteristic peaks were well indexed to the phase of BiOCl with the tetragonal crystal structure and the lattice parameters a=b=3.887 and c=7.354 Å (JCPDS NO. 01-082-0485), the monoclinic $Bi_{24}O_{31}Cl_{10}$ with the lattice constants a=9.995, b=3.969 and c=9.440 Å (JCPDS NO. 01-075-0887), the $\alpha$-$Fe_2O_3$ phase with the rhombohedral crystal structure (JCPDS File: 01-084-0307) at 2θ=24.2, 33.2, 35.7, 41.0, 49.6, 54.2, 62.6 and 64.2° and the cubic phase of $MnFe_2O_4$ (JCPDS File: 01-088-1965) at around 2θ=29.7, 35.0, 42.5, 56.2 and 61.7 that indicated in all nanocomposites synthesized by sono-solvothermal, the crystalline structure of the above phases was preserved.

For pure MFO (the absence of BOC), the characteristic peaks of the $\alpha$-$Fe_2O_3$ and $MnFe_2O_4$ phases was seen, which these results also indicate the formation of a mixed-phase and the creation an intra-heterostructure between two phases of $\alpha$-$Fe_2O_3$ and $MnFe_2O_4$.

Example 2: FESEM Analysis

FESEM (field emission scanning electron microscopy) images (300, 310, 320, 330) of BOC-MFO of 10 wt %, BOC-MFO of 20 wt %, BOC-MFO of 30 wt % and BOC-MFO of 40 wt % samples are displayed in FIG. 3A-FIG. 3D, respectively. As observed, the magnetic BOC-MFO nano-photocatalyst of 10 wt % has the nanosheet morphology, which these nanosheets contain nanoparticles of MFO. With increasing the content of MFO, the existing nanosheets were gradually stacked together, leading to the formation of plate-like clusters. The reason of the stacking and agglomeration of nanosheets and particles could be attributed to the interaction between magnetic nanoparticles. So that, with increasing the content of MFO, the stacking and agglomeration phenomenon was increased. This event could lead to a decrease in the surface adsorption and consequently a decrease in the photocatalytic activity of sample.

Figure 4A:
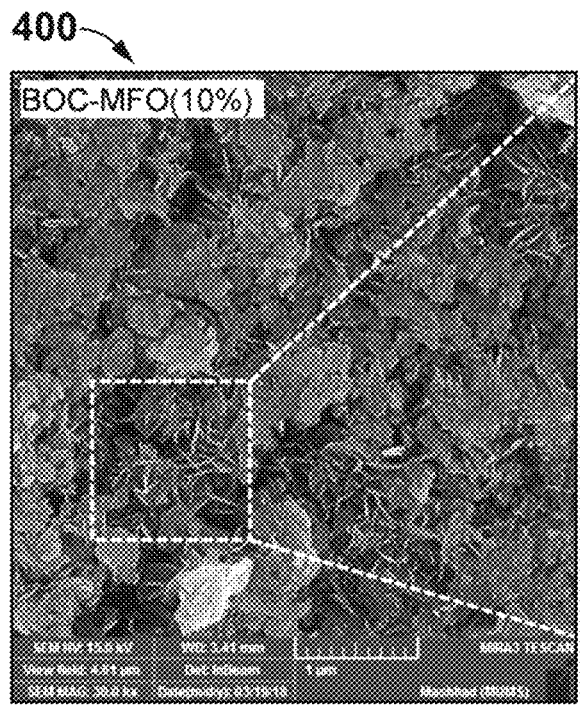
FIG. 4A exemplarily illustrates an image of a surface structure of $BiOCl—Bi_{24}O_{31}Cl_{10}/MnFe_2O_4—Fe_2O_3$ of 10 wt % magnified to 30.0kx using Field Emission Scanning Electron Microscopy (FESEM), according to an embodiment of the present invention.
Figure 4B:
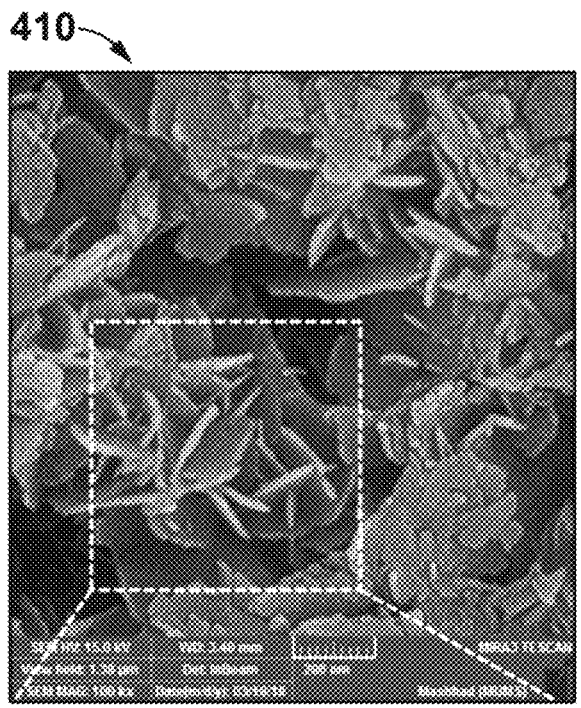
FIG. 4B exemplarily illustrates an image of a surface structure of $BiOCl—Bi_{24}O_{31}Cl_{10}/MnFe_2O_4—Fe_2O_3$ of 10 wt % magnified to 100kx using FESEM, according to an embodiment of the present invention.
Figure 4C:
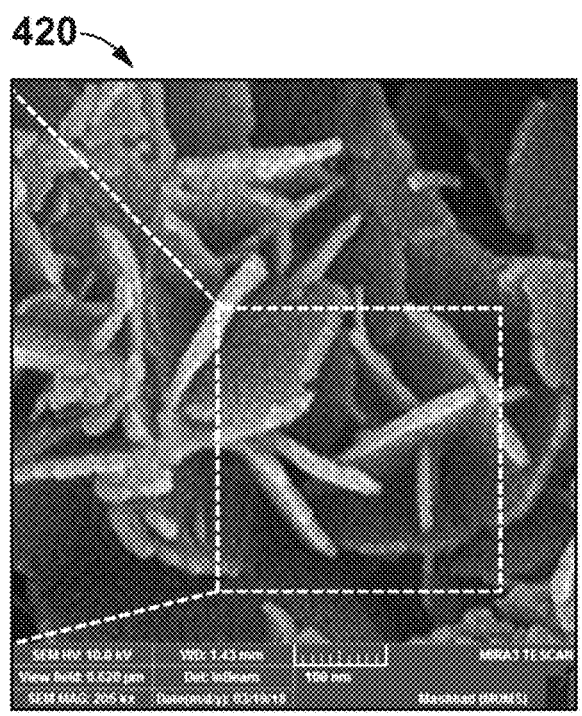
FIG. 4C exemplarily illustrates an image of a surface structure of $BiOCl—Bi_{24}O_{31}Cl_{10}/MnFe_2O_4—Fe_2O_3$ of 10 wt % magnified to 205kx using FESEM, according to an embodiment of the present invention.
Figure 4D:
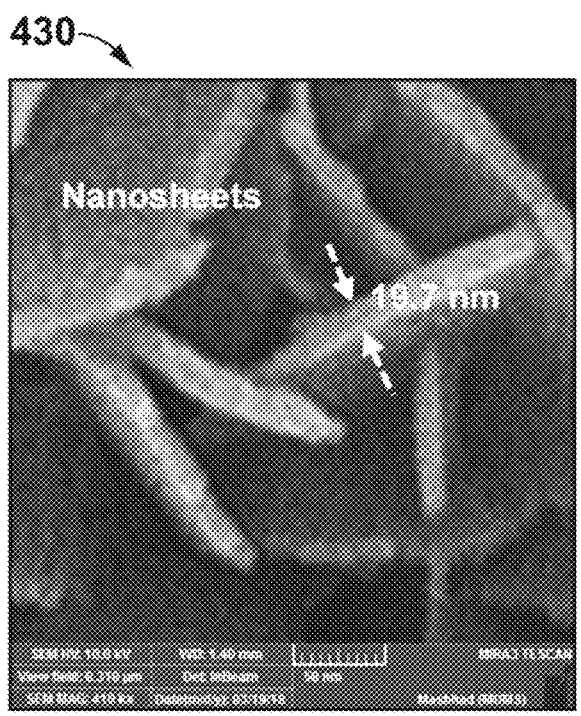
FIG. 4D exemplarily illustrates an image of a surface structure of $BiOCl—Bi_{24}O_{31}Cl_{10}/MnFe_2O_4—Fe_2O_3$ of 10 wt % magnified to 410kx using FESEM, according to an embodiment of the present invention.

Referring to FIG. 4A-FIG. 4D, the surface structure of the BOC-MFO nano-photocatalyst of 10 wt % is enlarged. FIG. 4A exemplarily illustrates an image 400 of the surface structure of BOC-MFO of 10 wt % magnified to 30.0kx using Field Emission Scanning Electron Microscopy (FE-SEM), according to an embodiment of the present invention. FIG. 4B exemplarily illustrates an image 410 of the surface structure of BOC-MFO of 10 wt % magnified to 100kx using FESEM, according to an embodiment of the present invention. FIG. 4C exemplarily illustrates an image 420 of the surface structure of BOC-MFO of 10 wt % magnified to 205kx using FESEM, according to an embodiment of the present invention. FIG. 4D exemplarily illustrates an image 430 of the surface structure of BOC-MFO of 10 wt % magnified to 410kx using FESEM, according to an embodiment of the present invention. As seen, the thickness of the sheets formed is about 19.7 nm. Additionally, images of all samples show that BOC-MFO nanocomposites were synthesized on a nanometer scale. One reason for this event could be attributed to the presence of ultrasound waves during synthesis.

Example 3: EDX-Dot Mapping Analysis

Figure 5A:
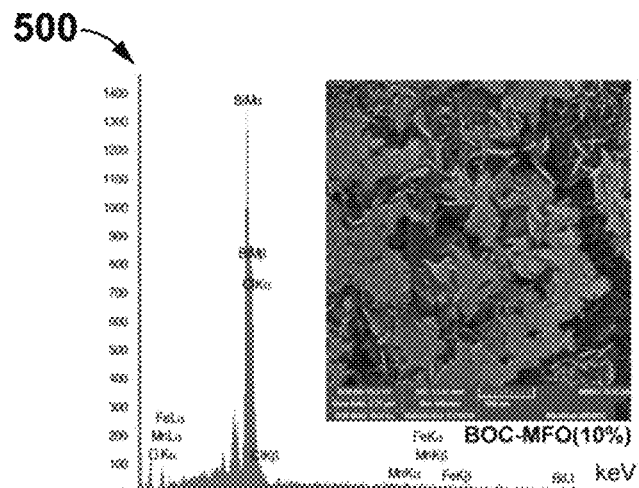
FIG. 5A exemplarily illustrates an energy dispersive X-ray analysis of $BiOCl—Bi_{24}O_{31}Cl_{10}/MnFe_2O_4—Fe_2O_3$ semiconductor of 10 wt %, according to an embodiment of the present invention.
Figure 5B:
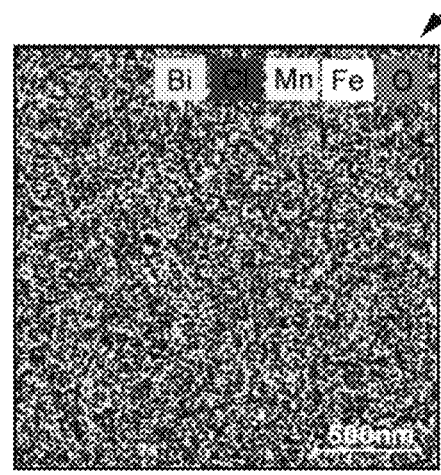
FIG. 5B exemplarily illustrates a dot-mapping image of $BiOCl—Bi_{24}O_{31}Cl_{10}/MnFe_2O_4—Fe_2O_3$ semiconductor of 10 wt %, according to an embodiment of the present invention.

Referring to FIG. 5A, the presence of Bi, O, Cl, Mn and Fe elements is confirmed in the structure of BOC-MOF (10%) sample from the EDX (energy dispersive X-ray) analysis image 500. A dot-mapping image 510 of all elements is represented in FIG. 5B.

Figure 5C:
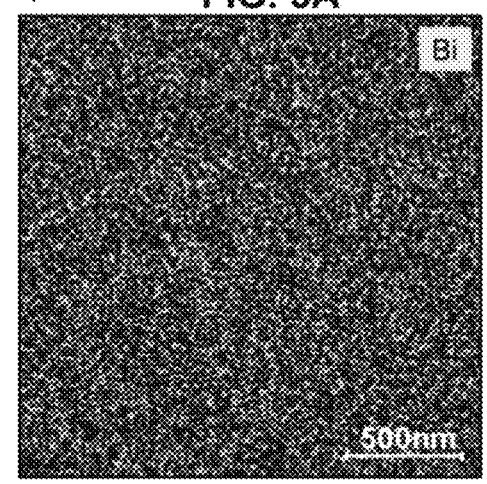
FIG. 5C exemplarily illustrates a dot-mapping image of Bi in $BiOCl—Bi_{24}O_{31}Cl_{10}/MnFe_2O_4—Fe_2O_3$ semiconductor of 10 wt %, according to an embodiment of the present invention.
Figure 5D:
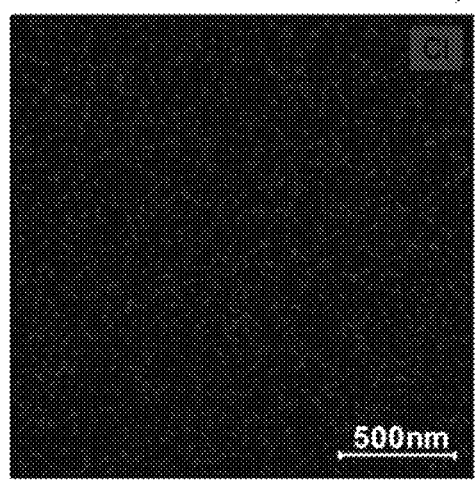
FIG. 5D exemplarily illustrates a dot-mapping image of Cl in $BiOCl—Bi_{24}O_{31}Cl_{10}/MnFe_2O_4—Fe_2O_3$ semiconductor of 10 wt %, according to an embodiment of the present invention.
Figure 5E:
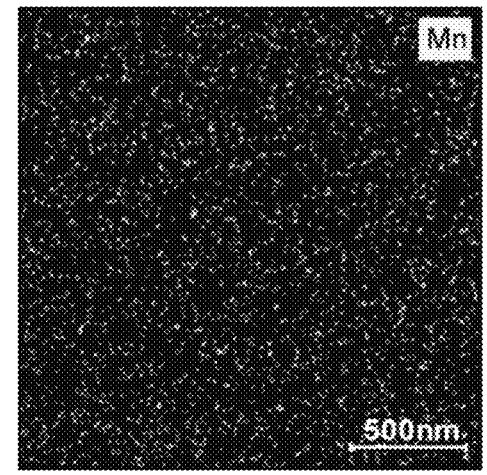
FIG. 5E exemplarily illustrates a dot-mapping image of Mn in $BiOCl—Bi_{24}O_{31}Cl_{10}/MnFe_2O_4—Fe_2O_3$ semiconductor of 10 wt %, according to an embodiment of the present invention.
Figure 5F:
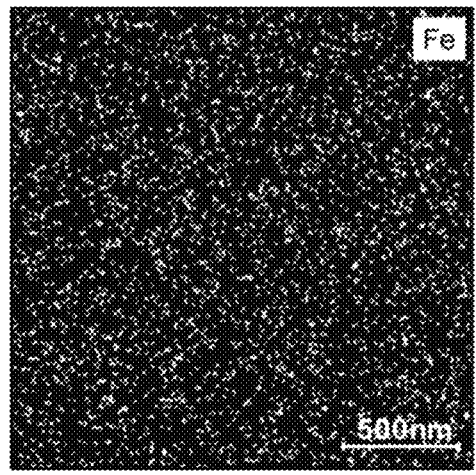
FIG. 5F exemplarily illustrates a dot-mapping image of Fe in $BiOCl—Bi_{24}O_{31}Cl_{10}/MnFe_2O_4—Fe_2O_3$ semiconductor of 10 wt %, according to an embodiment of the present invention.

FIG. 5C exemplarily illustrates a dot-mapping image 520 of Bi in $BiOCl-Bi_{24}O_{31}Cl_{10}/MnFe_2O_4-Fe_2O_3$ semiconductor of 10 wt %, according to an embodiment of the present invention. FIG. 5D exemplarily illustrates a dot-mapping image 530 of Cl in $BiOCl-Bi_{24}O_{31}Cl_{10}/MnFe_2O_4-Fe_2O_3$ semiconductor of 10 wt %, according to an embodiment of the present invention. FIG. 5E exemplarily illustrates a dot-mapping image 540 of Mn in $BiOCl-Bi_{24}O_{31}Cl_{10}/MnFe_2O_4-Fe_2O_3$ semiconductor of 10 wt %, according to an embodiment of the present invention. FIG. 5F exemplarily illustrates a dot-mapping image 550 of Fe in $BiOCl-Bi_{24}O_{31}Cl_{10}/MnFe_2O_4-Fe_2O_3$ semiconductor of 10 wt %, according to an embodiment of the present invention. Moreover, the dot-mapping images (510, 520, 530, 540, 550) of referred elements imply to the uniform distribution of them on the surface. Besides, results of EDX analysis 500 are evidence of the absence of impurities in the synthesized samples in this invention which confirm results obtained of XRD analysis.

Example 4: BET-BJH Analysis

Figure 6A:
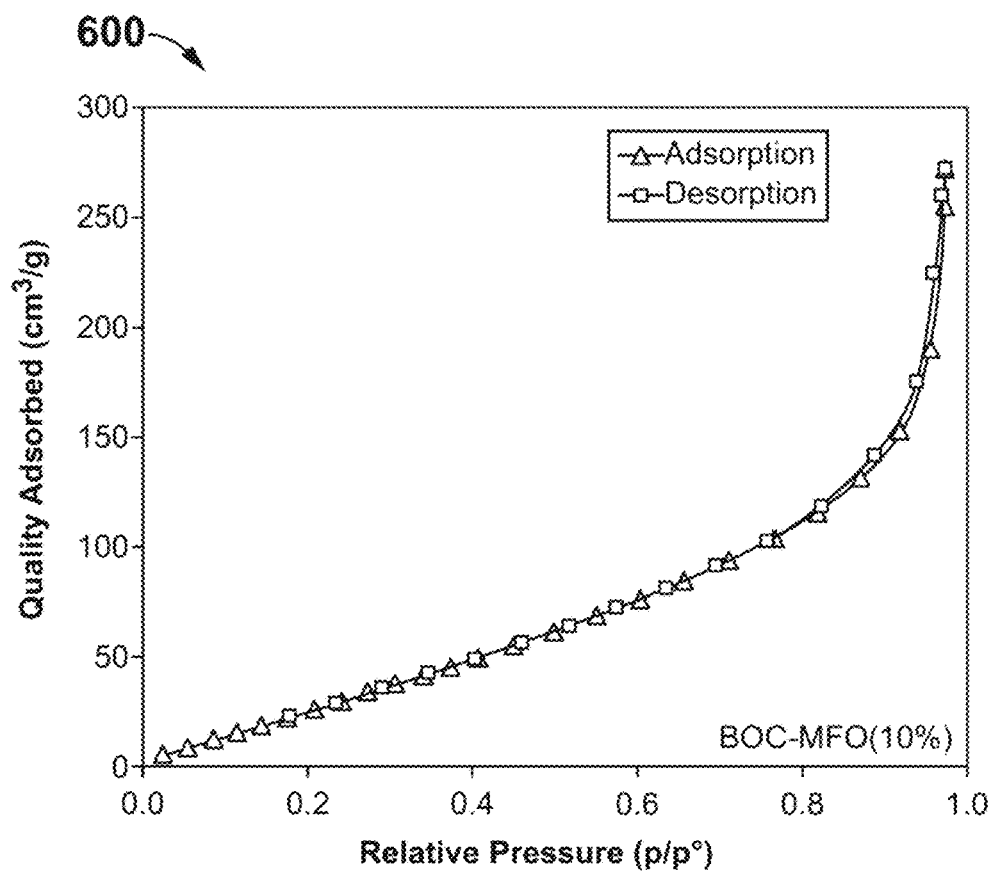
FIG. 6A exemplarily illustrates a graph of nitrogen adsorption/desorption isotherms of $BiOCl—Bi_{24}O_{31}Cl_{10}/MnFe_2O_4—Fe_2O_3$ of 10 wt %, according to an embodiment of the present invention.
Figure 6B:
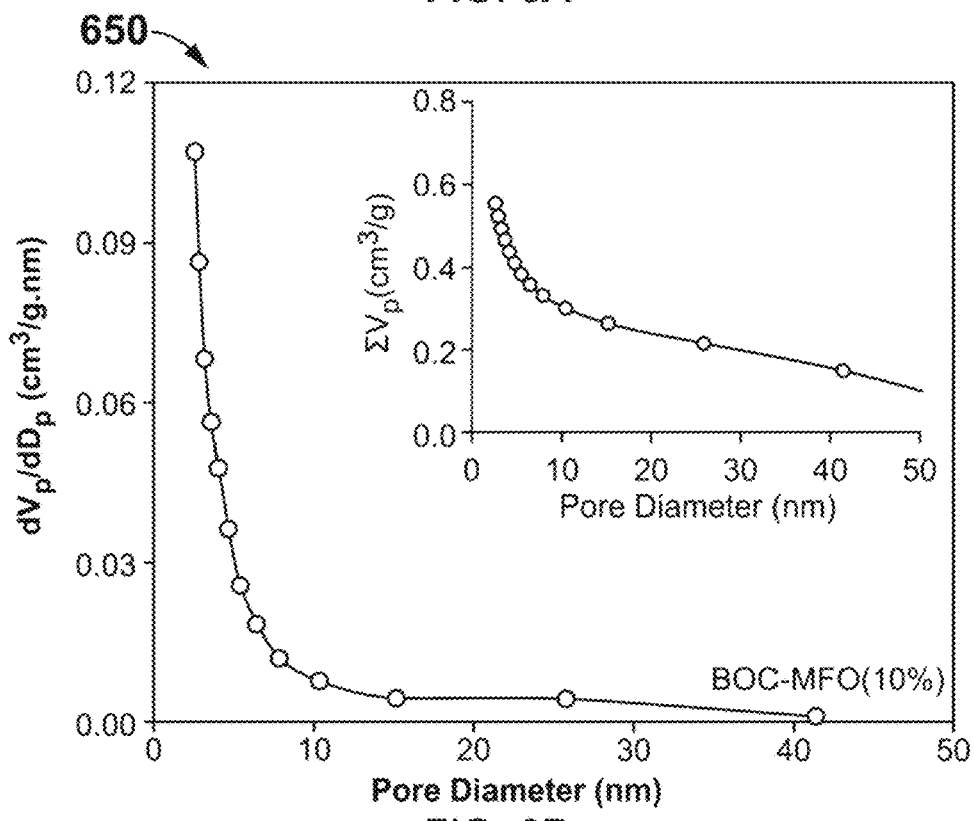
FIG. 6B exemplarily illustrates a graph of pore size distribution of $BiOCl—Bi_{24}O_{31}Cl_{10}/MnFe_2O_4—Fe_2O_3$ of 10 wt %, according to an embodiment of the present invention.

To estimate the specific surface area, total pore volume, diameter and type of constituent pores of BOC-MOF nanophotocatalyst of 10 wt %, Barrett-Emmett-Teller and Joyner-Halenda (BET-BJH) analysis based on nitrogen adsorption-desorption was conducted, indicating in FIG. 6A and FIG. 6B. As observed, the adsorption isotherm obtained of mentioned sample considering with IUPAC categorization expresses a model of the type IV with the hysteresis loop of type H1, whose imply to the existence of the mesoporous with the attendance of cylindrical-like pores into samples structures and is shown in graph 600 of FIG. 6A.

The pore size distribution, which were derived using BJH method from the desorption branch of the isotherm and is shown in graph 650 of FIG. 6B, further proving the mesostructures of pores. Furthermore, the specific surface area and the total pore volume for 10 wt % of BOC-MOF nano-photocatalyst were obtained at around 162.7 m$^2$/g and 0.556 cm$^3$/g, respectively. These results indicate that magnetic BOC-MOF nano-photocatalyst of 10 wt % has a significant specific surface area and pore volume, which could be ascribed to the presence of ultrasound waves during synthesis.

Example 5: DRS Analysis

Figure 7A:
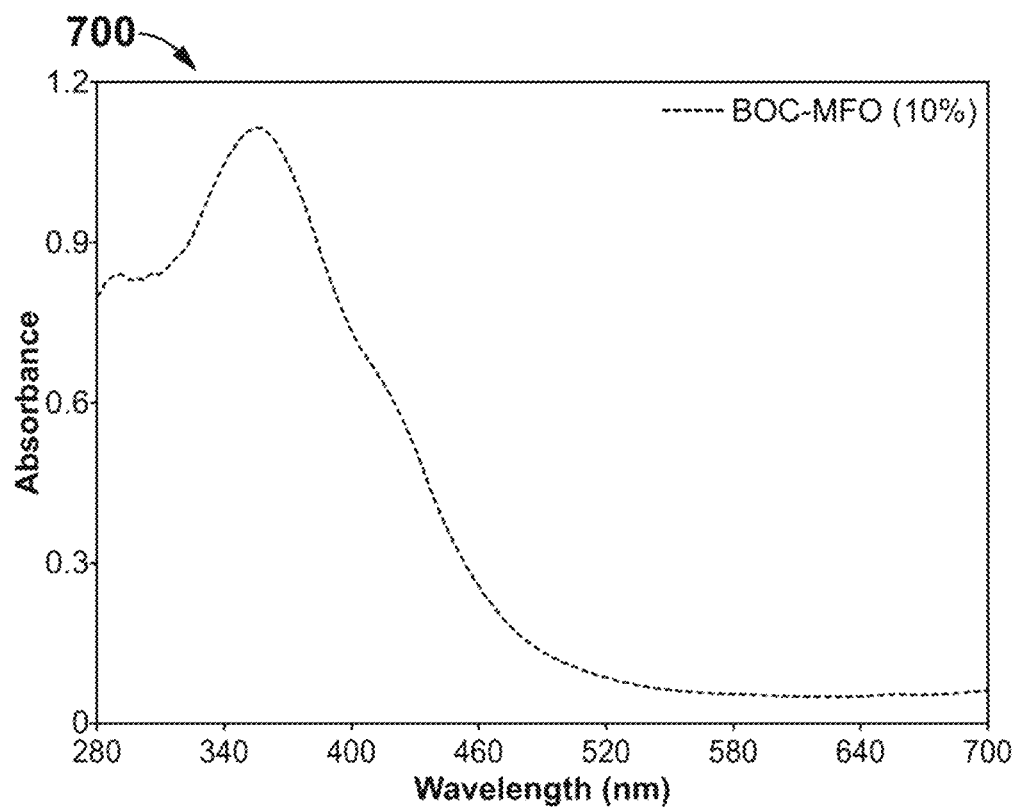
FIG. 7A exemplarily illustrates a graph of UV-vis diffuse reflectance spectra of $MnFe_2O_4—Fe_2O_3$ and $BiOCl—Bi_{24}O_{31}Cl_{10}/MnFe_2O_4—Fe_2O_3$ semiconductor of 10 wt %, according to an embodiment of the present invention.
Figure 7B:
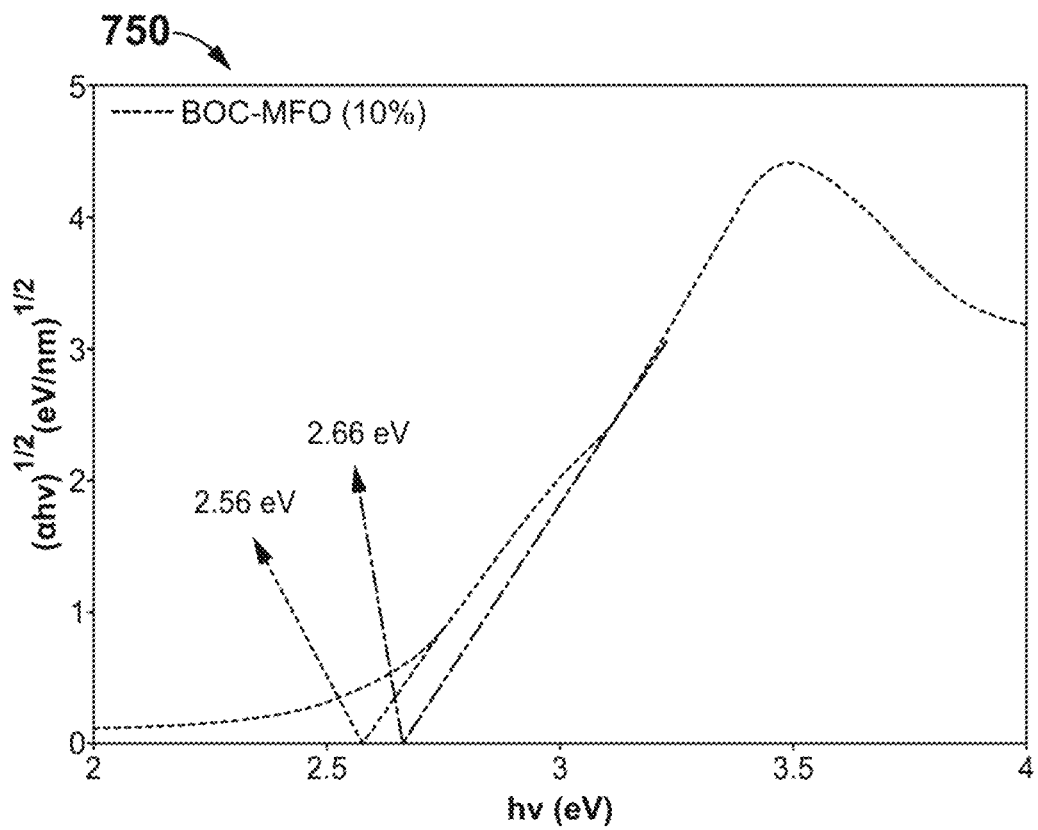
FIG. 7B exemplarily illustrates a graph of $(\alpha h\mu)^{1/2}$ versus photon energy (hu) of $MnFe_2O_4—Fe_2O_3$ and $BiOCl—Bi_{24}O_{31}Cl_{10}/MnFe_2O_4—Fe_2O_3$ semiconductor of 10 wt %, according to an embodiment of the present invention.

In order to evaluate the optical behavior and calculate the band gap of as-synthesized BOC-MFO of 10 wt %, the ultraviolet-visible diffuse reflectance spectra (DRS) from 280 to 700 nm were done, which results is shown in FIG. 7A-FIG. 7B. As shown in graph 700 of FIG. 7A, the mentioned sample has the light-absorption ability in the UV-visible light range. Therefore, in this novel semiconductor photocatalyst, charge carriers can generate under solar light irradiation. As can be seen, 10 wt % of BOC-MFO nanocomposite has two light absorption edges, demonstrating the formation of heterojunction between two phases of BOC and MFO. These two absorption edges are about 466 and 484 nm.

This result suggests that the BOC-MFO (10%) nano-photocatalyst can produce electron-hole pairs by absorbing light in the wavelength low than 484 nm. The bang gap is calculated using the DRS analysis and the Kubelka-Munk equation $((\alpha h\nu)^{0.5}=A (h\nu-Eg))$, where $\alpha$, h, $\nu$, A, $E_g$ are absorption coefficient, Planck constant (4.13567× 10-15 eV), light frequency, the constant and band gap energy of photocatalyst, respectively. As depicted in graph 750 of FIG. 7B, due to the formation of heterojunction, we could calculate two energy band gaps for the BOC-MFO (10%) nanocomposite (2.66 and 2.56 eV).

Example 6: VSM Analysis

Figure 8A:
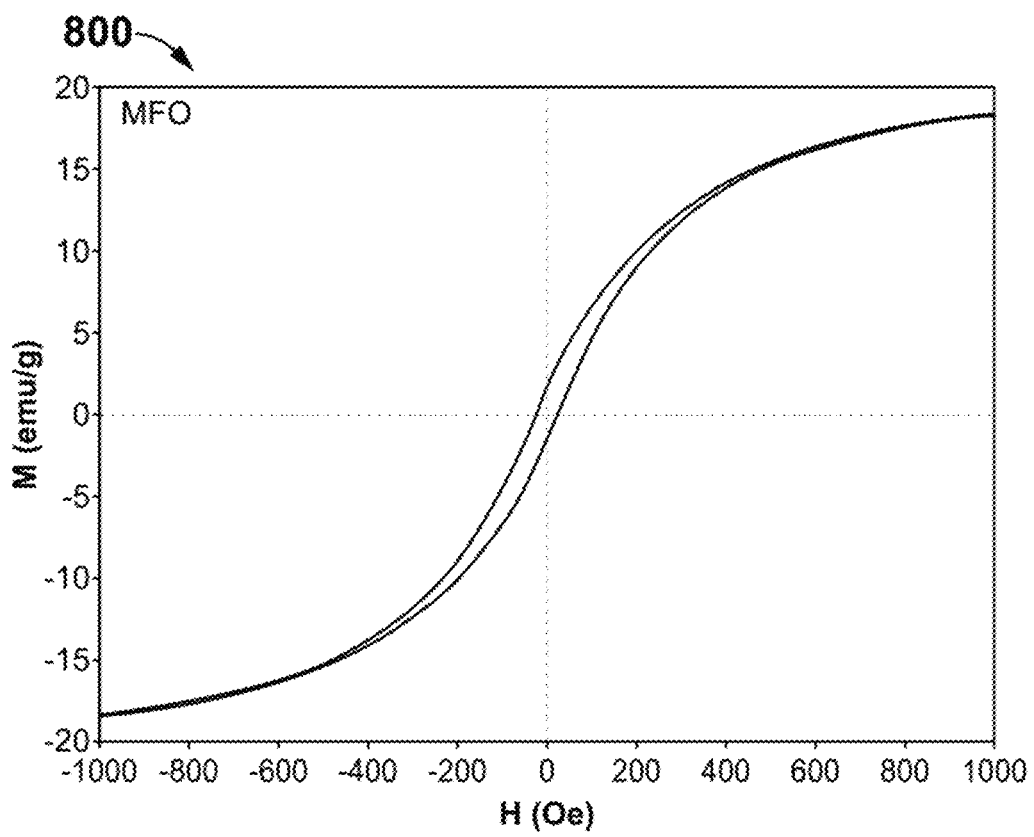
FIG. 8A is a graph illustrating result of magnetization hysteresis carried out at room temperature using a vibrating sample magnetometer of $MnFe_2O_4—Fe_2O_3$, according to an embodiment of the present invention.
Figure 8B:
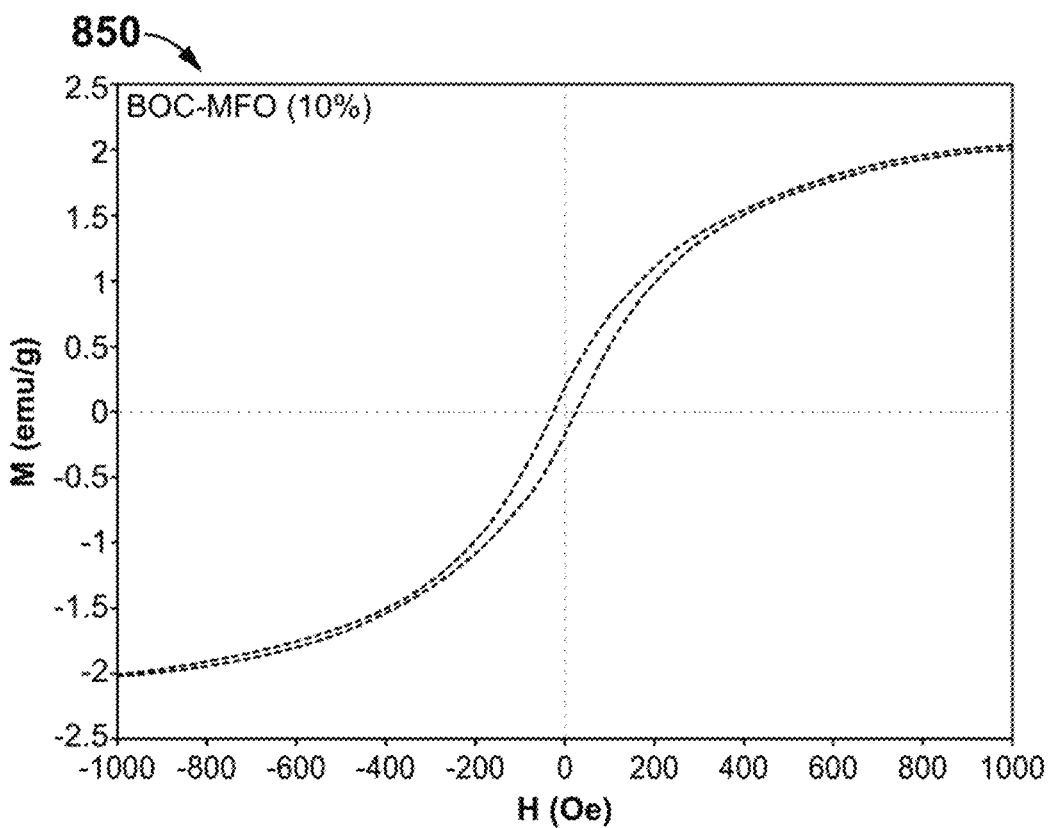
FIG. 8B is a graph illustrating result of magnetization hysteresis carried out at room temperature using a vibrating sample magnetometer of $BiOCl\ Bi_{24}O_{31}Cl_{10}/MnFe_2O_4—Fe_2O_3$ of 10 wt %, according to an embodiment of the present invention.

To evaluate the magnetic properties of BOC-MFO (10%) and MFO samples, the VSM analysis (vibrating sample magnetometer) was carried out at the room temperature. Graphs (800, 850) illustrating the results are shown in FIG. 8A and FIG. 8B, respectively. As observed, both samples display a nonlinear and reversible behavior with a hysteresis loop, indicating that they are ferromagnetic materials. The saturation magnetization (Ms) for MFO and BOC-MFO (10%) was obtained at about 20.57 and 2.26 emu/g, respectively. The Ms value for BOC-MFO (10%) is less than that of MFO, due to the presence of non-magnetic BOC. However, the ferromagnetic property of BOC-MFO (10%) nanocomposite verifies that this nano-photocatalyst can be easily separated from the treated aqueous solution using an external magnet.

Figure 9:
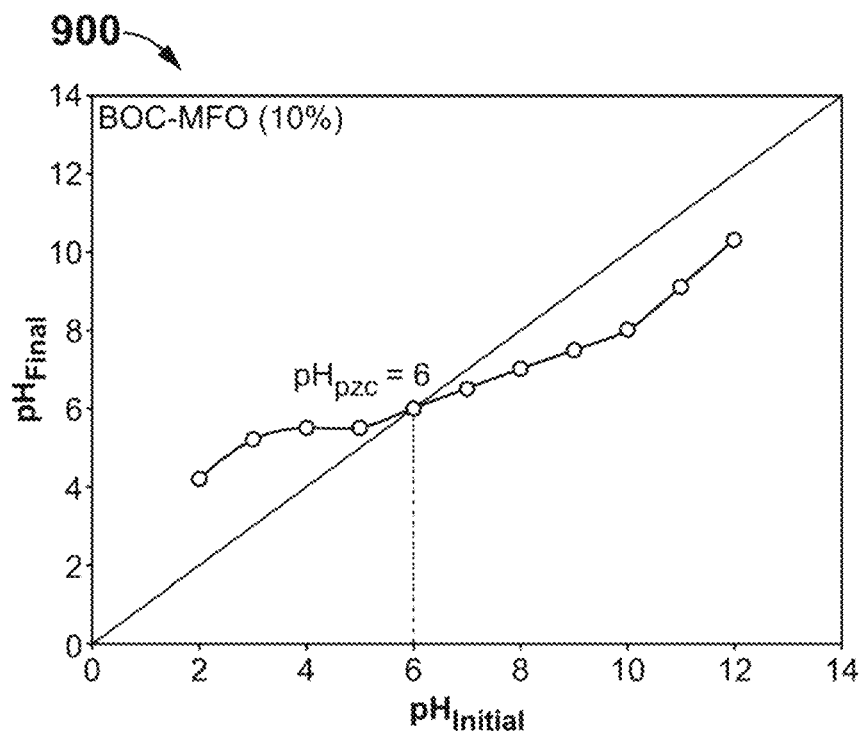
FIG. 9 is a graph illustrating result of pH value at the point of zero charge (pHpzc) of $BiOCl—Bi_{24}O_{31}Cl_{10}/MnFe_2O_4—Fe_2O_3$ semiconductor of 10 wt %, according to an embodiment of the present invention.

Example 7: pHpzc Analysis pHpzc (pH value at the point of zero charge), as a surface feature, is an effective parameter to determine the photocatalyst surface charge, which has a noteworthy effect on the adsorption of pollutants and subsequently on the photodegradation efficiency. Referring to FIG. 9, according to a graph 900 illustrating the result, the pH value at the point of zero charge (pHpzc) measured for the BOC-MFO (10%) nanocomposite as an optimum sample is at around 6. So, the surface charge of photocatalyst in a solution with pH=6, pH<6 or pH>6 is zwitterion, positive and negative, respectively.

Example 8: Reactor Tests

Evaluation of Photocatalytic Performance:

TABLE 1

| Chemical structure | Chemical formula | Molecular weight (g/mol) | Isoelectric constants (pKa) | λ max(nm) | Therapeutic group |
|---|---|---|---|---|---|
| 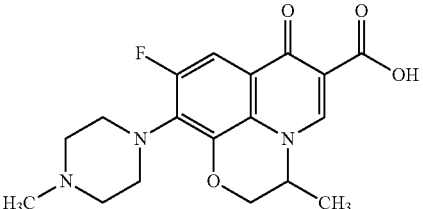 | $C_{18}H_{20}FN_3O_4$ | 361.368 | pKa1 = 6.10 and pKa2 = 8.28 | Amphoteric and acidic environment: 287 Basic environment: 288 | Antibiotic (Fluoroquinolone) |

To estimate and evaluate the heterogeneous photocatalytic ability of nanocomposite fabricated, the photodegradation of ofloxacin (as an antibiotic pollutant which its physicochemical properties is presented in Table 1) into the aqueous solution was performed at the ambient temperature and pressure under a 400 W halogen lamp, as the simulated sunlight source, which emits wavelengths higher to 315 nm.

The nanocomposite (BOC-MFO (10%), BOC-MFO (20%), BOC-MFO (30%) and BOC-MFO (40%)) of 0.2 g was poured into 200 mL of the aqueous solution, which involved 25 mg/L ofloxacin. This mixture was placed in the dark surroundings for 30 min while the mixture was stirred magnetically to reach adsorption/desorption equilibration between ofloxacin molecules and the surface of nanocomposites.

The BOC-MFO (10%) of 0.4 g was poured into 200 mL of the aqueous solution, which involved 25 mg/L ofloxacin with pH=6. This mixture was placed in the dark surroundings for 30 min while the mixture was stirred magnetically to reach adsorption/desorption equilibration between ofloxacin molecules and the surface of BOC-MFO (10%).

The BOC-MFO (10%) of 1 g was poured into 200 mL of the aqueous solution, which involved 25 mg/L ofloxacin with pH=6. This mixture was placed in the dark surroundings for 30 min while the mixture was stirred magnetically to reach adsorption/desorption equilibration between ofloxacin molecules and the surface of BOC-MFO (10%).

The BOC-MFO (10%) of 0.2 g was poured into 200 mL of the aqueous solution, which involved 15 mg/L ofloxacin with pH=6. This mixture was placed in the dark surroundings for 30 min while the mixture was stirred magnetically to reach adsorption/desorption equilibration between ofloxacin molecules and the surface of BOC-MFO (10%).

The BOC-MFO (10%) of 0.2 g was poured into 200 mL of the aqueous solution, which involved 35 mg/L ofloxacin with pH=6. This mixture was placed in the dark surroundings for 30 min while the mixture was stirred magnetically to reach adsorption/desorption equilibration between ofloxacin molecules and the surface of BOC-MFO (10%).

The BOC-MFO (10%) of 0.2 g was poured into 200 mL of the aqueous solution, which involved 25 mg/L ofloxacin with pH=3. This mixture was placed in the dark surroundings for 30 min while the mixture was stirred magnetically to reach adsorption/desorption equilibration between ofloxacin molecules and the surface of BOC-MFO (10%).

The BOC-MFO (10%) of 0.2 g was poured into 200 mL of the aqueous solution, which involved 25 mg/L ofloxacin with pH=9. This mixture was placed in the dark surroundings for 30 min while the mixture was stirred magnetically to reach adsorption/desorption equilibration between ofloxacin molecules and the surface of BOC-MFO (10%).

Afterward, the lamp was turned on and the reactor was exposed to the irradiation of the light source for 120 min. In during of the remediation process, 5 mL of suspension was sampled in the intervals of 15 min. Then, the taken sample was centrifuged to deposit the nano-photocatalyst. In order to monitor the pollutant concentration, UV-Vis spectrophotometer was used and the measurement was done at the 287 nm. The efficiency of heterogeneous photo-degradation was computed using E $\%=(1-C/C_0)*100$ equation, that $C_0$ is belonged to the initial concentration of the pollutant after reaching the adsorption equilibrium; C is belonged to the concentration at the time t.

Figure 10A:
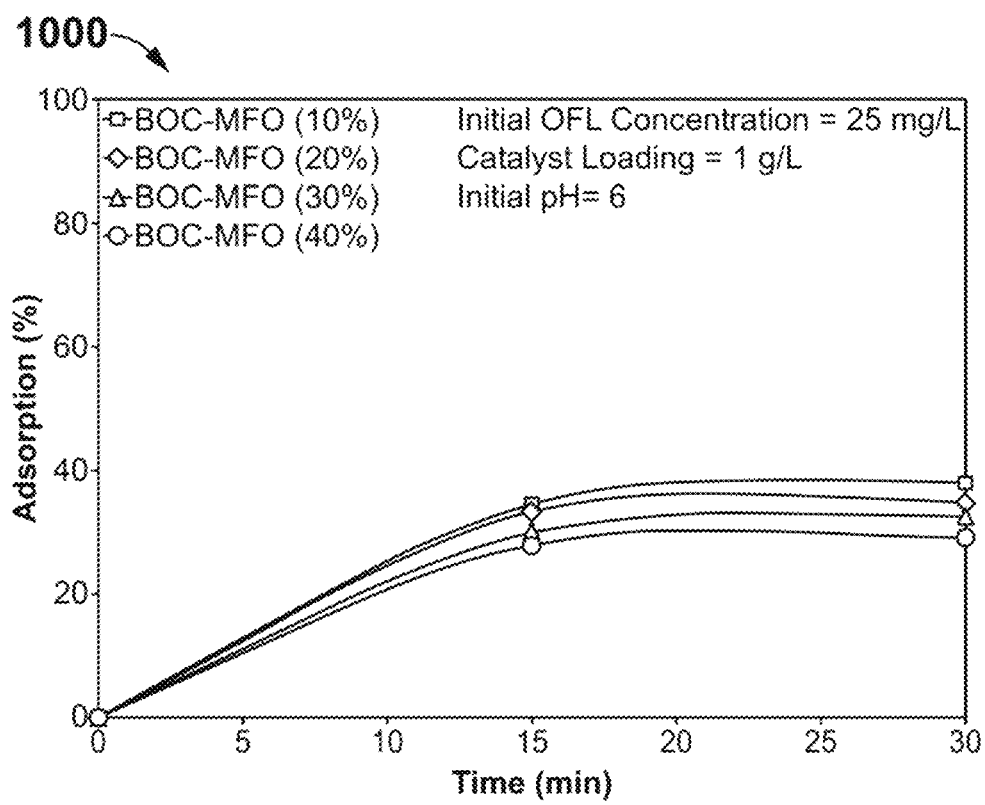
FIG. 10A is a graph illustrating result of photocatalytic performance of $BiOCl—Bi_{24}O_{31}Cl_{10}/MnFe_2O_4—Fe_2O_3$ semiconductors toward adsorption of antibiotic ofloxacin in darkness, where the initial pH is 6, catalyst loading is 1 g/L and initial concentration is 25 mg/L, according to an embodiment of the present invention.
Figure 10B:
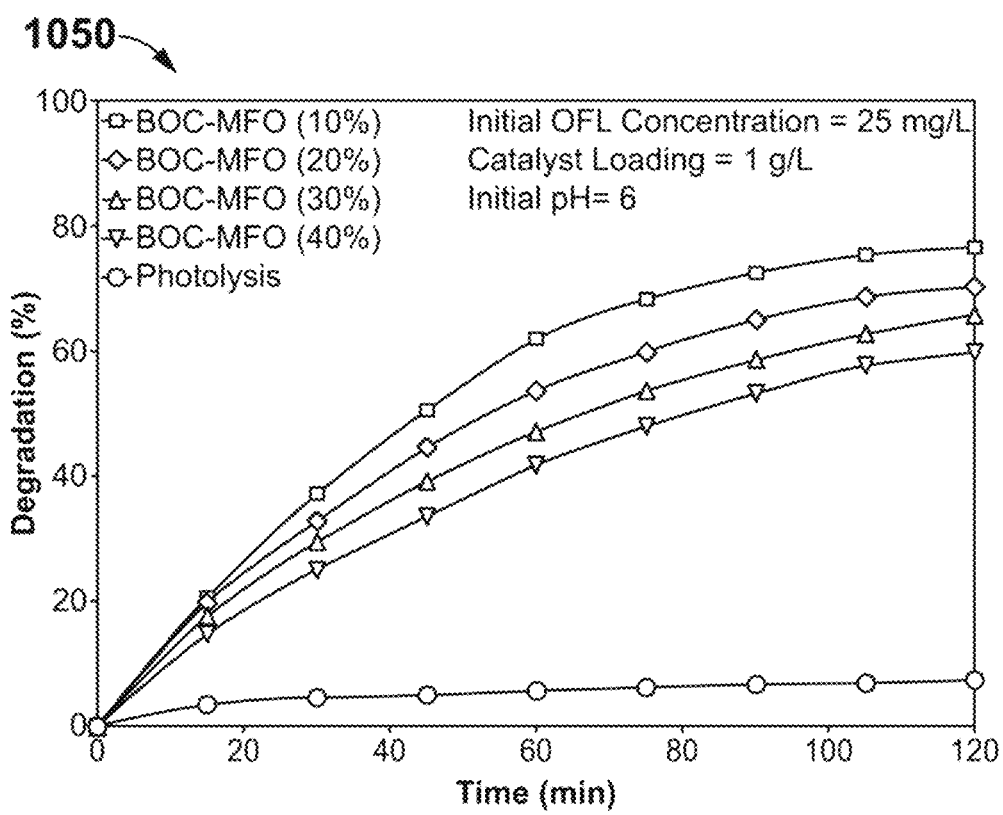
FIG. 10B is a graph illustrating result of photocatalytic performance of $BiOCl—Bi_{24}O_{31}Cl_{10}/MnFe_2O_4—Fe_2O_3$ semiconductors toward degradation of antibiotic ofloxacin under simulated solar light, where the initial pH is 6, catalyst loading is 1 g/L and initial concentration is 25 mg/L, according to an embodiment of the present invention.

Referring to a graph 1000 of FIG. 10A, the highest amount of adsorption of ofloxacin is belong to BOC-MFO (10%) which can be attributed to the larger specific surface area and total pore volume and meso-structure of pores, which were proved by BET-Bill results. Referring to a graph 1050 of FIG. 10B, the photolysis experiment of ofloxacin demonstrated the negligible decomposition, indicating this antibiotic cannot decompose under the simulate solar light irradiation, whereas the photo-degradation efficiency content of it over the BOC-MFO (10%), BOC-MFO (20%), BOC-MFO (30%) and BOC-MFO (40%) magnetic nanocomposites was determined 76.5, 70.2, 65.7 and 59.8% during 120 min of irradiation, respectively. It is worth noting that other conditions were: pH=6, catalysts dosage=1 g/L and initial ofloxacin concentration=25 mg/L. As it is obvious, BOC-MFO (10%) nano-photocatalyst presented the highest activity in the degradation of ofloxacin at mentioned conditions.

According to results related to various analyses, this sample appears to be the selected photocatalyst among the magnetic nanocomposites. The reason of the increasing performance of the degradation process by referred sample could be ascribed to the effective formation of a heterojunction between MFO and BOC phases. This hetero-structure can increase the light absorption, accelerate the separation of charge carriers and reduce their recombination. Moreover, the use of ultrasonic waves resulted in a uniform distribution of particles, as the number of available sites increased.

Example 9: Influence of Photocatalyst Loading

Figure 11:
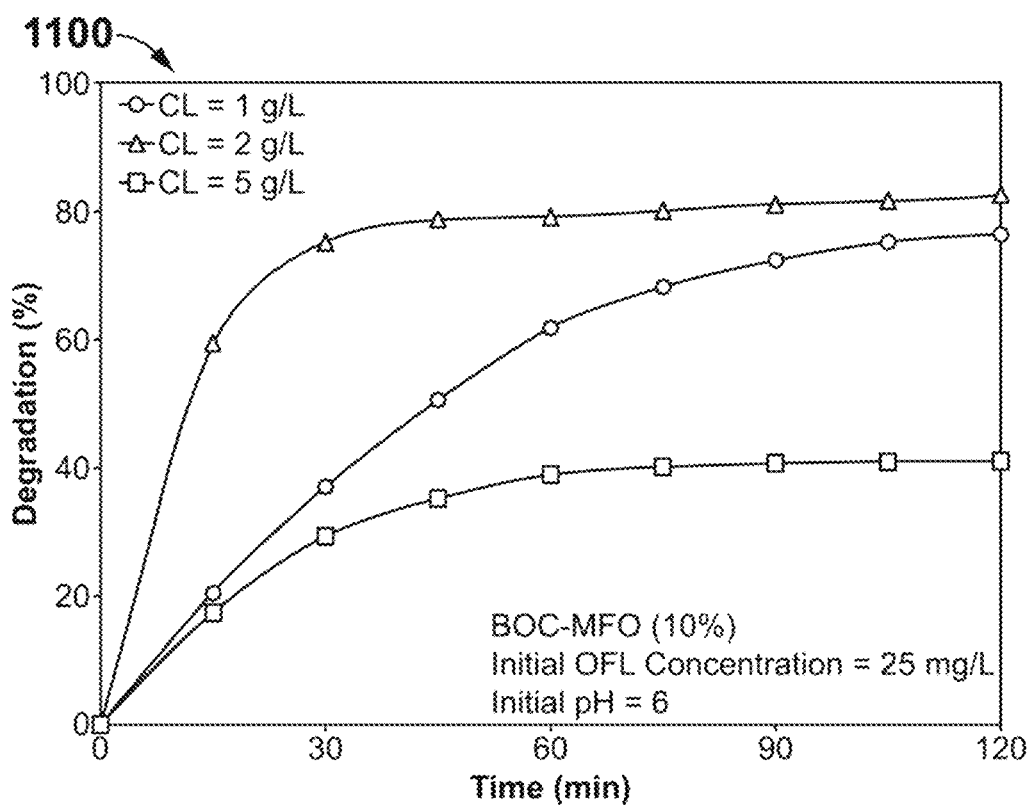
FIG. 11 is a graph illustrating result of influence of catalyst loading on the performance of $BiOCl—Bi_{24}O_{31}Cl_{10}/MnFe_2O_4—Fe_2O_3$ of 10 wt % toward degradation of antibiotic ofloxacin under simulated solar light, where initial pH is 6 and initial concentration is 25 mg/L, according to an embodiment of the present invention.

FIG. 11 is a graph 1100 illustrating the influence of the loading of BOC-MFO (10%) nano-photocatalyst on the degradation efficiency of ofloxacin. To evaluate the effect of catalyst loading, the quantity of 1, 2 and 5 g/L from the BOC-MFO (10%) sample was tested in the degradation of 25 mg/L ofloxacin. The percentage of ofloxacin removal in each test was 76.5, 82.4, and 41.2%, respectively. These results can be interpreted as follows: with increasing of the loading from 1 to 2 g/L, the number of available active sites for the absorption of light irradiated and generation of charge carrier and subsequently, the production of active species (such as superoxide radicals and holes) increases.

Therefore, the percentage of degradation increases. However, increasing the loading to more than 2 g/L leads to the increasing opacity, resulting in the light scattering and light refraction. The light refraction and light scattering cause that the amount of energy associated with hv which reaches to the photocatalyst surface reduces. Thus, the number of charge carriers will be reduced. Additionally, there also is the possibility of reducing the number of active sites owing to the agglomeration of nanoparticles or clusters. The events mentioned can decrease the degradation efficiency.

Example 10: Influence of Initial pH

Figure 12:
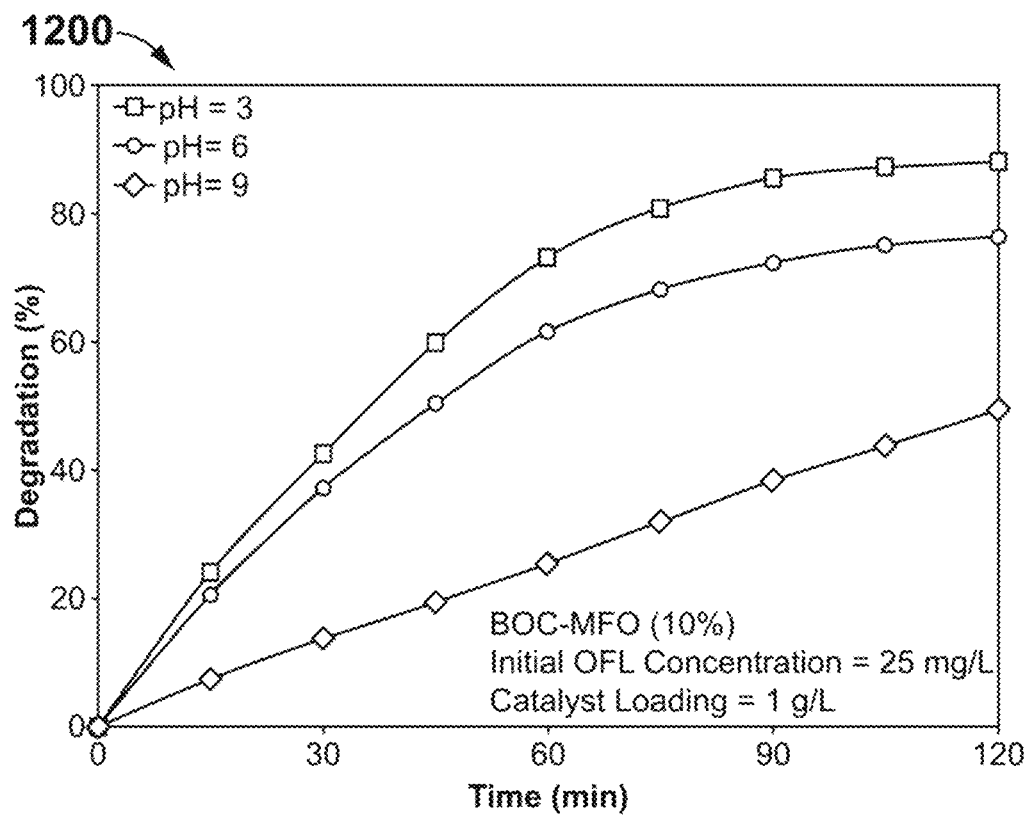
FIG. 12 is a graph illustrating result of influence of initial pH on the performance of $BiOCl—Bi_{24}O_{31}Cl_{10}/MnFe_2O_4—Fe_2O_3$ of 10 wt % toward degradation of antibiotic ofloxacin under simulated solar light, and catalyst loading is 1 g/L and initial concentration is 25 mg/L, according to an embodiment of the present invention.

The pH of solution plays a decisive role in the efficiency of the photocatalytic degradation of organic pollutants, as an advanced oxidation process, especially about antibiotics due to the existence of two isoelectric constants. In order to evaluate the influence of pH on the degradation performance of ofloxacin, experiments were conducted at the pH=3, 6 and 9 that are given in a graph 1200 of FIG. 12. As can be observed, the process efficiency at the pH=3, 6 and 9 was obtained 88.2, 76.5 and 49.5% during 120 min simulated solar light irradiation, respectively. Although, ofloxacin in the acidic medium such as pH=3 considering to the pKa1=6.10 ionizes as a cation and the surface charge of BOC-MFO (10%) is positive but the ofloxacin photodegradation in this pH can occur higher due to that the electrons received on the surface catalyst may be consumed by the protonation portions of surface or the existing $H^+$ ions in the solution.

The consumption of electrons can be further reduced the recombination rate of photoinduced electrons and holes on the surface. Therefore, there are more holes, as the most crucial active specie to destroy ofloxacin. In contrast, in the high pH media (such as pH=9) the surface charge of the BOC-MFO (10%) is negative and ofloxacin also ionizes as an anion considering to the pKa1=8.28. Since the present partial negative charges on the surface of BOC-MFO (10%) and present $OH^-$ ions in the solution have the high affinity with holes, so the role of this active specie diminishes extremely, leading to the decrease of degradation efficiency of ofloxacin. It is worth noting, in the pH=6, the occurrence of this event is far less and besides, the adsorption content of ofloxacin on the surface will also increase, considering the charges of photocatalyst surface and ofloxacin molecule.

Example 11: Effect of Initial Concentration

Figure 13:
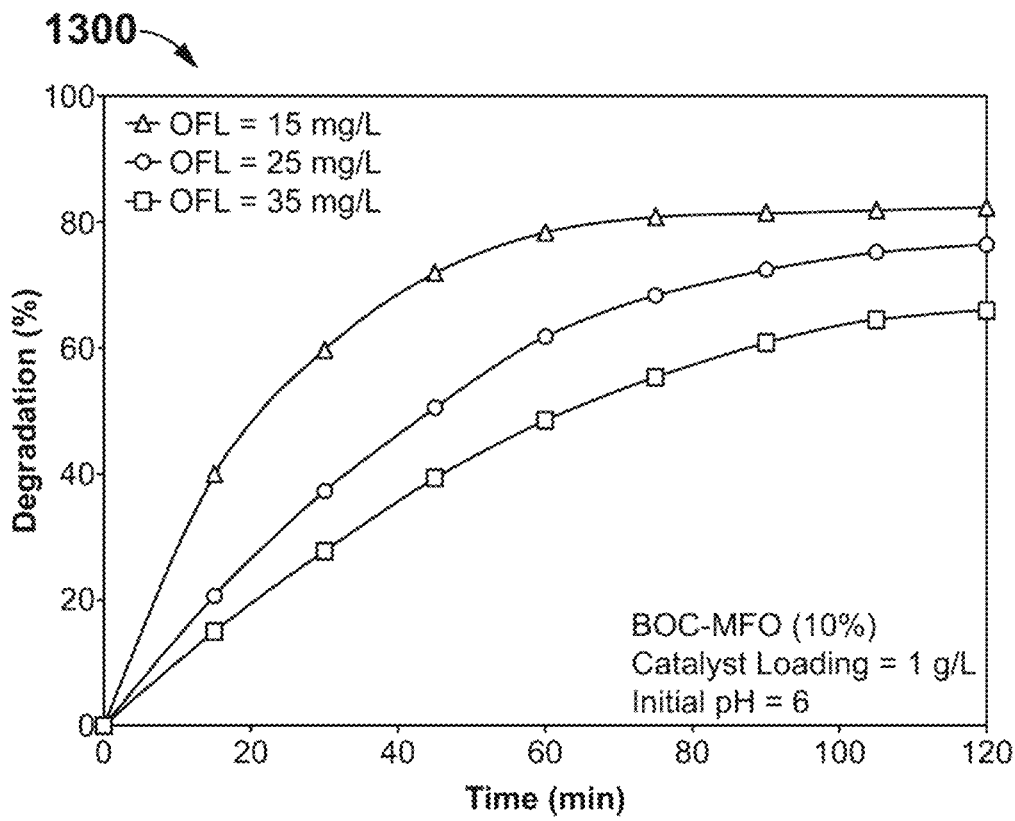
FIG. 13 is a graph illustrating result of influence of initial ofloxacin concentration on the performance of BiOCl—$Bi_{24}O_{31}Cl_{10}$/$MnFe_2O_4$—$Fe_2O_3$ of 10 wt % toward degradation of antibiotic ofloxacin under simulated solar light, where the initial pH is 6 and catalyst loading is 1 g/L, according to an embodiment of the present invention.

Another affecting parameter on the efficiency of the photocatalytic process is the initial concentration of the pollutant. FIG. 13 shows a graph 1300 illustrating the effect of the primary concentration of ofloxacin on the removal efficiency over the BOC-MFO (10%) nano-photocatalyst. At three initial concentrations of 15, 25 and 35 mg/L, the efficiency percentage was obtained 82.5, 76.5% and 66.0%, respectively. As clearly observed, the efficiency decreases with the increase of ofloxacin concentration. An interpretation of this result is that when the initial concentration of pollutant increases, the adsorption of its molecules increases extremely on the photocatalyst surface.

Therefore, the generation of reactive oxygen species will decrease because of the many active sites occupied by pollutant molecules. In addition, the increment of ofloxacin concentration causes to that the light irradiated with same initial energy don't reach the surface of photocatalyst due to the absorption of light by the contaminant molecules adsorbed on the surface. There may also be a competitive state between the intermediate molecules formed by the photodecomposition of ofloxacin and the contaminant molecules, which will also reduce the process efficiency.

In general, according to the above mentioned descriptions, it can be stated the following items for BOC-MFO (10%) nanocomposite: (i) for conditions, where the catalyst loading is 1 g/L, initial concentration is 15 mg/L and initial pH is 6, the degradation percentage was obtained 82.5%; (ii) for conditions, where the catalyst loading is 2 g/L, initial concentration is 25 mg/L and initial pH is 6, the degradation percentage was obtained 82.4%; and (iii) for conditions, where the catalyst loading is 1 g/L, initial concentration is 25 mg/L and initial pH is 3, the degradation percentage was obtained 88.2%.

Consequences depict that at concentrations of about 15 mg/L, loading values of about 2 g/L and at acidic pH, the possibility to achieve high efficiency is provided. These results indicate the successful performance of this nano-photocatalyst. This despite the fact that Bhatia and coworkers (Bhatia et al., 2016) were reported 86% removal for aqueous solution containing 25 mg/L ofloxacin with pH=3, 1.5 g/L of catalyst loading and after 6 hours (360 minutes). The photocatalyst applied in this research was $TiO_2$ doped with Bi—Ni. As observed, in present invention the operating conditions, especially reaction time, using the BOC-MFO (10%) was greatly improved owing to the consideration of effective factors in its design.

Example 12: Reusability Study

Figure 14:
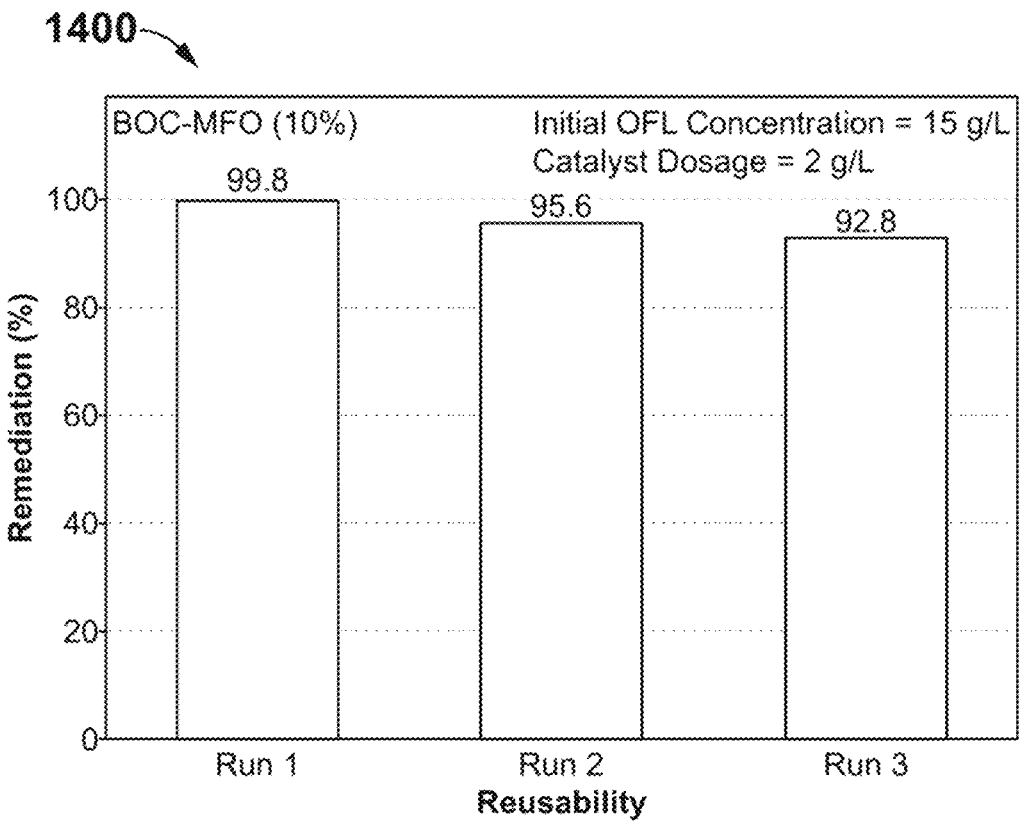
FIG. 14 is a graph illustrating result of reusability of BiOCl—$Bi_{24}O_{31}Cl_{10}$/$MnFe_2O_4$—$Fe_2O_3$ of 10 wt % toward remediation of antibiotic ofloxacin, where the initial concentration is 15 mg/L, catalyst loading is 2 g/L and initial pH is 2, according to an embodiment of the present invention.

As shown in a graph 1400 of FIG. 14, the stability and reusability of BOC-MFO (10%) as the optimal sample was studied by evaluating its performance with three times of recycling tests under simulated solar light irradiation (initial concentration of ofloxacin: 15 mg/L; loading: 1 g/L and initial pH: at about 2). The remediation percentage was estimated using the equation below: Remediation %=(1-$A_t$/$A_i$)*100. In above equation, $A_i$ and $A_t$ are the initial concentration of the pollutant and the concentration at the time t, respectively. Powders of catalyst after each experiment were separated and after washing, dried at 110° C. The reduced removal rate at about 7% after 3 cycles should be attributed to the weakness of surface grafts and the happening of leaching or the poisoning of nano-photocatalyst, which reduces the absorption of light.

Example 13: Suggested Reaction Pathway

Figure 15:
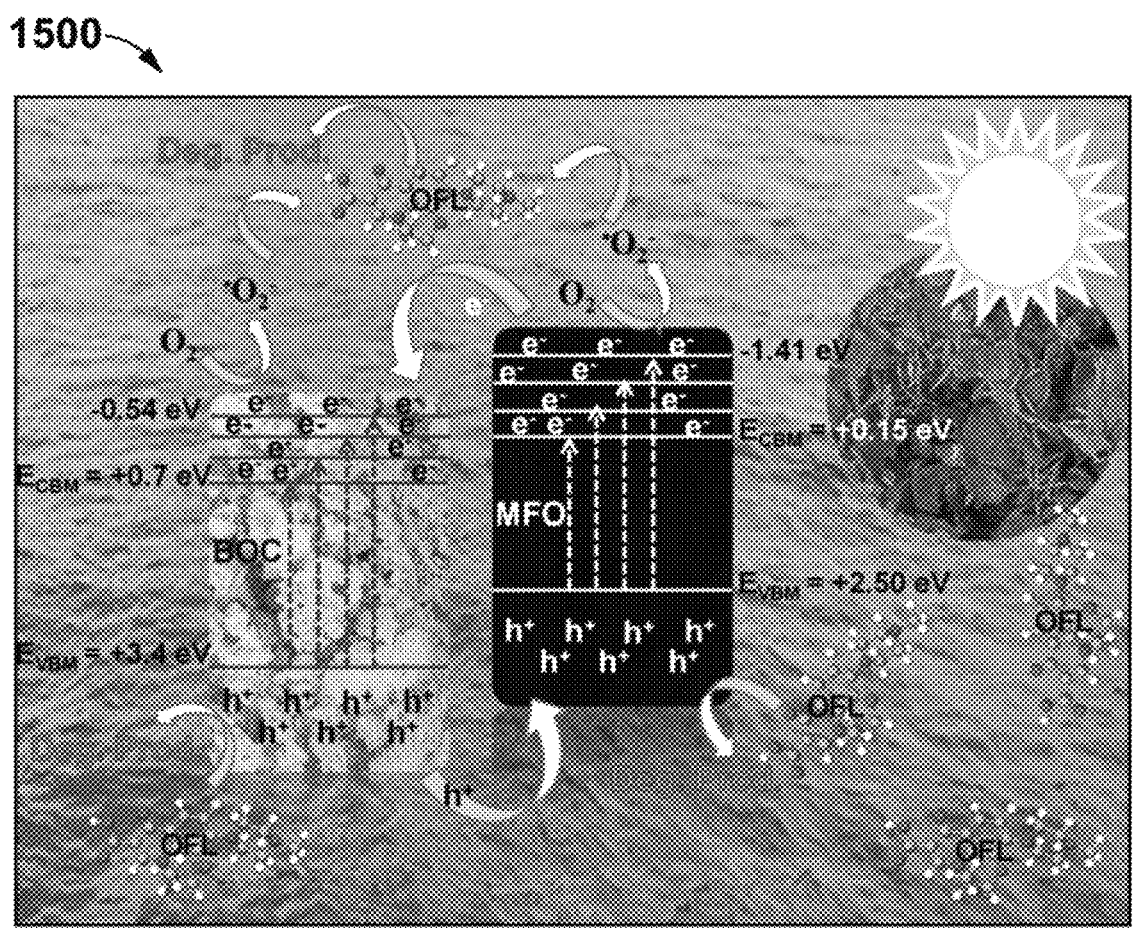
FIG. 15 is the reaction mechanism for the removal of antibiotic ofloxacin under simulated solar light from polluted aqueous solution over BiOCl—$Bi_{24}O_{31}Cl_{10}$/$MnFe_2O_4$—$Fe_2O_3$ semiconductor of 10 wt %, according to an embodiment of the present invention.

The suggested reaction mechanism for the degradation of ofloxacin antibiotic, as a refractory and complex model pollutant, over BOC-MFO (10%) is represented 1500 in FIG. 15. Using the following equations were determined potential energies associated with the valance band maximum (EVBM) and the conduction band minimum (ECBM) of BOC and MFO nano-photocatalysts.

$$ECBM = X - Ee - 0.5Eg$$

$$EVBM = ECBM + Eg$$

In these equations, X, Ee, Eg represent the electronegativity of the photocatalyst, energy of free electrons on the hydrogen scale (4.5 eV) and band gap energy, respectively. With respect to the above equations, the ECBM calculated for BOC and MFO nano-photocatalyst were +0.7 and +0.15 eV, respectively and calculated EVBM were about +3.40 and +2.50 eV, respectively. Experience has shown that the placement position of energy levels and the formation of staggered heterojunction are caused to improving the separation of the charge carriers. In other words, the existing electrons of the valence band both of two photocatalysts are transferred to their conduction band and holes remain in their valence band under simulated solar-light.

Since the conduction band in MFO is more negative than BOC, so, photogenerated electrons on the conduction band layers of MFO can migrate to the conduction band layers of BOC. Moreover, because the energy of the existing holes in the valance band layers of BOC is more, thus, these holes could migrate to the MFO valance band layers. This state reduces the recombination rate of the electron-hole pairs. Additionally, there is an intra-heterojunction between BiOCl and $Bi_{24}O_{31}Cl_{10}$ in the structure of BOC and an intra-heterojunction between $Fe_2O_3$ and $MnFe_2O_4$ in the structure of MFO that could be further reduced the recombination phenomena related to charge carriers.

Therefore, a staggered multi-heterojunction is formed in the structure of BOC-MFO (10%) nanocomposite according to the quantum perspective. It is worth noting that since in present invention, the maximum energy emitted from light source was about 315 nm (3.9 eV), so electrons from valence band of BOC and MFO can excite to the level of energy in the conduction band of BOC and MFO with potential energy at about −0.54 eV and −1.41 eV, respectively. Thus, electrons migrated from the conduction layers of the MFO to the BOC conduction layers.

In view of the redox potential of $O_2/.O_2^-$ (−0.33 eV), it is possible to produce superoxide radicals by more negative energy levels. Finally, the produced radicals and holes can react with the ofloxacin molecules and generate the degradation products. According to above statements, the following reactions could be proposed for removal of pollutant:

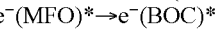
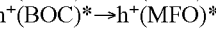
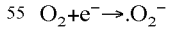
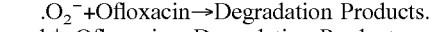

BOC+hv→BOC*($e^-$+$h^+$)
MFO+hv→MFO*($e^-$+$h^+$)
$e^-$(MFO)*→$e^-$(BOC)*
$h^+$(BOC)*→$h^+$(MFO)*
$O_2$+$e^-$→$.O_2^-$
$.O_2^-$+Ofloxacin→Degradation Products.
$h^+$+Ofloxacin→Degradation Products.

Example 14: Kinetic Evaluation

Figure 16A:
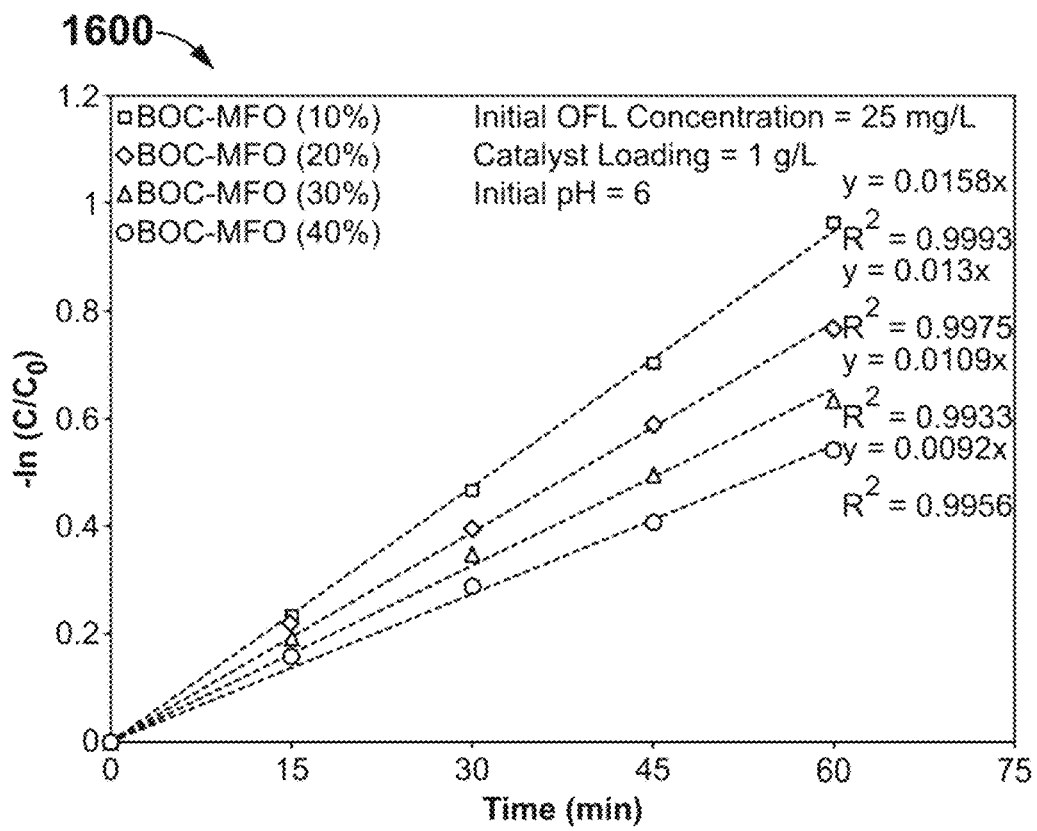
FIG. 16A is a graph illustrating result of kinetic consideration, $-\ln(C/C0)$, of BiOCl—$Bi_{24}O_{31}Cl_{10}$/$MnFe_2O_4$—$Fe_2O_3$ semiconductors, where the initial pH is 6, catalyst loading is 1 g/L and initial concentration is 25 mg/L, according to an embodiment of the present invention.
Figure 16B:
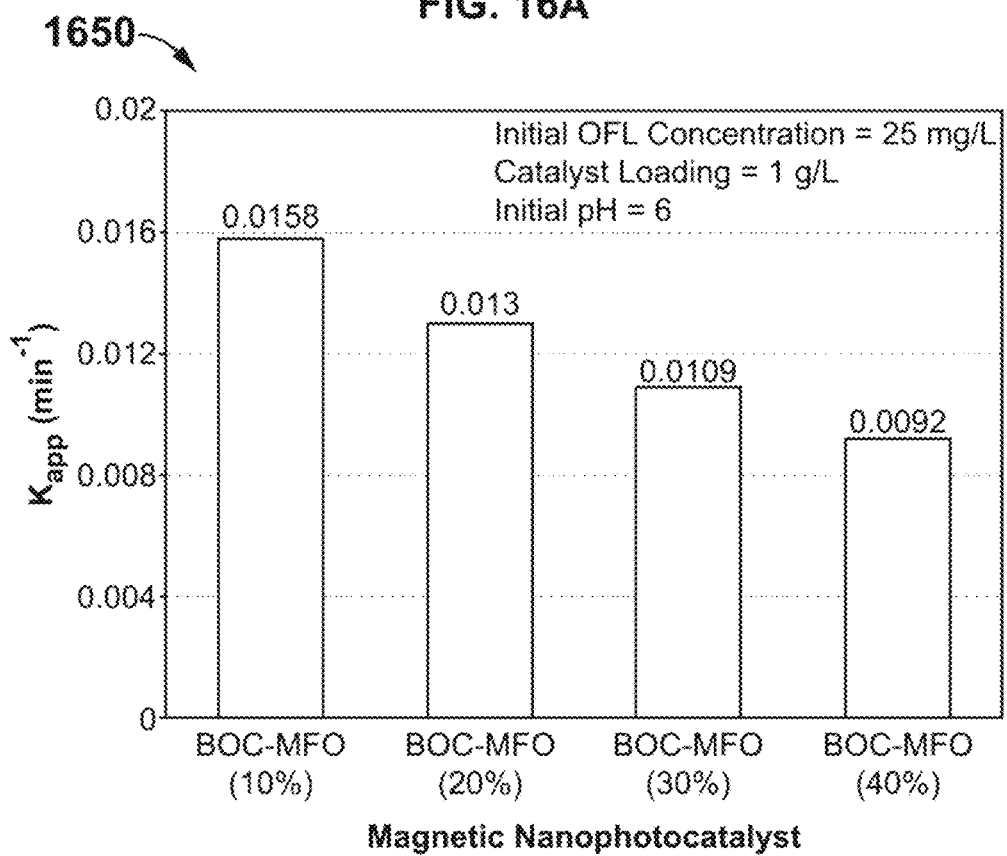
FIG. 16B is a graph illustrating result of kinetic consideration, rate constant, of BiOCl—$Bi_{24}O_{31}Cl_{10}$/$MnFe_2O_4$—$Fe_2O_3$ semiconductors, where the initial pH is 6, catalyst loading is 1 g/L and initial concentration is 25 mg/L, according to an embodiment of the present invention.

To evaluate the kinetic rates of the ofloxacin photodegradation on the as-synthesized nanocomposites, pseudo-first-order kinetic pattern (as −ln(C/C0) vs. kt) was used, that the experiments outcomes are expressed in graphs (1600, 1650) of FIG. 16A and FIG. 16B. As shown, the amount of appeared rate constant (denoted $k_{app}$) over BOC-MFO (10%), BOC-MFO (20%), BOC-MFO (30%) and BOC- MFO (40%) samples was gained 0.0158, 0.013, 0.0109 and 0.0092 min$^{-1}$, respectively. These data reveal that BOC-MFO (10%) gives the better photocatalytic activity in the photodecomposition of ofloxacin under simulated sun-light irradiance.

Advantages of the present invention is disclosed as follows: (i) with design of a photocatalyst as a magnetic BiOCl—Bi$_{24}$O$_{31}$Cl$_{10}$/MnFe$_2$O$_4$—Fe$_2$O$_3$ nanocomposite photocatalyst with 10% MFO, it could cover the challenges as follow: conformation of its high activity in the sunlight spectrum compared to pure BiOCl; facilitating intra-particle mass transfer (Step 2 of 7 steps in photocatalytic/catalytic processes) compared to pure BiOCl; increasing surface adsorption phenomenon (Step 3 of 7 steps in photocatalytic/catalytic processes) compared to pure BiOCl and BiOCl—Bi$_{24}$O$_{31}$Cl$_{10}$; Improving its surface reactions as increasing the light absorption range, probably increasing quantum efficiency and reducing the recombination phenomenon (Step 4 of 7 steps in photocatalytic/catalytic processes) compared to pure BiOCl and BiOCl—Bi$_{24}$O$_{31}$Cl$_{10}$; conformation of its separation facilitation from treated aqueous solution compared to pure BiOCl and BiOCl—Bi$_{24}$O$_{31}$Cl$_{10}$; its good stability after three cycles at pH=3, catalyst loading=2 g/L and pollutant concentration=15 mg/L and remediation (adsorption+degradation) obtained: 99.8% in the degradation of a complex and emerging pollutant. So that it can be a more effective perspective to do the future investigation; (ii) the precursors used for the fabrication of the BiOCl—Bi$_{24}$O$_{31}$Cl$_{10}$/MnFe$_2$O$_4$—Fe$_2$O$_3$ nanocomposites are in-expensive, readily available, and non-toxic, which are important parameters in the synthesis and production of a material; (iii) the sono-solvothermal employed to fabricate the magnetic BiOCl—Bi$_{24}$O$_{31}$Cl$_{10}$/MnFe$_2$O$_4$—Fe$_2$O$_3$ nanocomposites are: simple, suitable temperature and time conditions which are controllable, the possibility of effective mixing and dispersing between precursors and the creation of a homogeneous solution and the ability to produce controllable morphologies; (iv) the BiOCl—Bi$_{24}$O$_{31}$Cl$_{10}$/MnFe$_2$O$_4$—Fe$_2$O$_3$ nanocomposite with 10% MnFe$_2$O$_4$—Fe$_2$O$_3$ has a good activity and stability; (v) development and improvement of technical knowledge in order to design and achieve the active photocatalysts in the solar region, which the factors, such as surface reactions, surface adsorption and separation, have been improved; (vi) treatment of water polluted to the resistant organic contaminants, such as antibiotics. The antibiotics are resistant and persistent. Moreover, they can cause toxicity in the environment. Additionally, they can lead to the degradation of microbial population that exists in the soil and water, causing the immunity of microorganisms, which this event leads to the mutation and produce of the more resistant species of bacteria and microbes; and (vii) treatment of water polluted to the resistant organic contaminants using an environmentally friendly and not-expensive method that could operate at the ambient temperature and pressure.

BiOCl—Bi$_{24}$O$_{31}$Cl$_{10}$/MnFe$_2$O$_4$—Fe$_2$O$_3$ semiconductor as a magnetic staggered multi-heterojunction structure and a solar light activated nano-photocatalyst for the remediation of pharmaceutical effluents (such as ofloxacin antibiotic) was successfully synthesized via solvothermal method combined with the ultrasonic irradiance (denoted as: sono-solvothermal). This structure leads to the increment of the light absorption range, facilitation of mass transfer, increasing surface adsorption of contaminant molecules and increasing the efficacious separation and transmission of photoinduced charge carriers, resulting in a reduction of the excitons recombination rate. So, the process efficiency will be increased. Furthermore, due to the magnetic property created, the possibility to separate easily the photocatalyst from treated pharmaceutical effluent is provided.

In this invention, the photocatalytic degradation of ofloxacin (fluoroquinolone antibiotic and as an emerging contaminant and as a model pollutant with high resistance and complex structure) was investigated to evaluate the performance of nano-photocatalyst synthesized. In other terms, the highlighted advantages are: (a) sono-solvothermal synthesis of the novel BiOCl—Bi$_{24}$O$_{31}$Cl$_{10}$/MnFe$_2$O$_4$—Fe$_2$O$_3$ semiconductor, as staggered multi-heterojunction and solar light activated nano-photocatalyst, in line with the above-mentioned design parameters namely with high activity in the sunlight spectrum, facilitating intra-particle mass transfer, increasing surface adsorption phenomenon, improving its surface reactions as increasing the light absorption range, probably increasing quantum efficiency and reducing the recombination phenomenon, separation facilitation from treated aqueous solution; (b) evaluation of various contents of MnFe$_2$O$_4$—Fe$_2$O$_3$ and the determination of optimum weighted percentage; (c) synthesis of mesostructure staggered multi-heterojunction nanocomposite, which has been had the appropriate specific surface area and pore volume. It is worth noting, organic pollutants are the coarse molecules, so the existence of mesoporous could cause to facilitate the diffusion of organic molecules; (d) synthesis of staggered multi-heterojunction BiOCl—Bi$_{24}$O$_{31}$Cl$_{10}$ (90%)/MnFe$_2$O$_4$—Fe$_2$O$_3$ (10%) nanocomposite with appropriate saturation magnetization to facilitate the separation process; (e) highest degradation efficiency over BiOCl—Bi$_{24}$O$_{31}$Cl$_{10}$ (90%)/MnFe$_2$O$_4$—Fe$_2$O$_3$ (10%) namely: remediation (adsorption+degradation) at pH=3, catalyst loading=2 g/L and pollutant concentration=15 mg/L was obtained 99.8% in the degradation of ofloxacin as complex and emerging pollutant; (f) increase of reaction rate upon over BiOCl—Bi$_{24}$O$_{31}$Cl$_{10}$ (90%)/MnFe$_2$O$_4$—Fe$_2$O$_3$ (10%); (g) efficacious degradation of fluoroquinolone antibiotic under sunlight irradiation; (h) higher spectrum response and the effective separation of charge carriers; (j) good stability after three cycles at pH=3, catalyst loading=2 g/L and pollutant concentration=15 mg/L for BiOCl—Bi$_{24}$O$_{31}$Cl$_{10}$ (90%)/MnFe$_2$O$_4$—Fe$_2$O$_3$ (10%); (k) evaluation of the operating parameters influence (such as pollutant concentration, loading and the initial pH of solution) on the process efficiency; (i) discussion of photodegradation mechanism over BiOCl—Bi$_{24}$O$_{31}$Cl$_{10}$ (90%)/MnFe$_2$O$_4$—Fe$_2$O$_3$ (10%).

Moreover, BOC-MFO with 10% MFO is non-toxic and has magnetic property. Besides, it is active in the sunlight spectrum and has the nanosheet morphology, which the thickness of the sheets constituent is about 19.7 nm. This nano-photocatalyst has the high BET surface area and pore volume and the pores constituent are at mesoporous category. Additionally, due to intra-heterojunction and staggered heterojunction between the existing phases, the lifetime of charge carriers increases; Besides the BOC-MFO with 10% MFO has a good performance at determined conditions and the relatively short time for the degradation of ofloxacin antibiotic (as an emerging contaminant and complex) under simulated solar light. It is also easily separated from treated effluents.

The main challenges for photocatalysis process and the features/method of the present invention to overcome the challenges are discussed as follows. Generally, the main challenges for photocatalysis process could be divided into five general items: (i) low efficiency relevant to surface reactions (such as low photocatalyst activity in the sunlight region and high rate of electron-hole pair recombination); (ii) resistance to intra-particle diffusion; (iii) low adsorption capacity; (iv) low stability; (v) separation issue.

Regarding to the mentioned challenges, in this invention, the BiOCl—BiOCl—$Bi_{24}O_{31}Cl_{10}$/$MnFe_2O_4$—$Fe_2O_3$ (10%) semiconductor with considering effective factors from engineering perspective was synthesized with the following features: (i) considering XRD patterns, the presence of four phases related to BiOCl, $Bi_{24}O_{31}Cl_{10}$, $MnFe_2O_4$ and $Fe_2O_3$ in the structure of the mentioned novel nanocomposite is proved; (ii) considering DRS analysis, there is two absorption edges at 466 and 484 nm, which will improve the surface reactions (Step 4 of 7 steps in photocatalytic/catalytic processes); (iii) considering BET-BJH analysis, the surface area and total pore volume are obtained more than 160 $m^2/g$ and 0.5 $cm^3/g$, respectively. Moreover, using this analysis, the mesoporous structure of mentioned nanocomposite is proved. This structure is more useful for the diffusion of coarse molecules such as ofloxacin. In other words, considering BET-BJH analysis, the intra-particle mass transfer (Step 2 of 7 steps in photocatalytic/catalytic processes) is facilitate and the surface adsorption phenomenon (Step 3 of 7 steps in photocatalytic/catalytic processes) is increased; (iv) considering FESEM analysis, the thickness of the sheets constituent is about 19.7 nm. This morphology could be enhanced the light penetration with energy emitted and facilitated the available to the active sites.

(v) considering XRD patterns and DRS analysis, it is as a staggered multi-heterojunction structure and a solar light activated nano-photocatalyst; (vi) considering the type-II formed from the quantum perspective, the separation of charge carriers could be effectively occurred; (vii) considering VSM analysis, it has the saturation magnetization up to 2 emu/g which could facilitate the separation issue; (viii) using this nanocomposite, the reaction rate obeys from pseudo-first-order kinetic model. the appeared constant of this nanocomposite is obtained about 0.0158 $min^{-1}$; (x) using this nanocomposite, the relatively short reaction time will be needed for the removal of ofloxacin antibiotic, and the occurrence of surface reactions is enhanced; (xi) it has the ability of the efficacious degradation of colorless organic pollutants under sunlight irradiation and displays a good stability after three cycles. So that it can be a more effective perspective to do the future investigation.

BiOCl—$Bi_{24}O_{31}Cl_{10}$/$MnFe_2O_4$—$Fe_2O_3$ semiconductors with weighted ratios 9:1 4:1, 7:3 and 3:2 were synthesized via sono-solvothermal method and employed in the photocatalytic degradation of antibiotic ofloxacin (OFL) from the polluted aqueous solution under simulated solar light. The results revealed that the BiOCl—$Bi_{24}O_{31}Cl_{10}$/$MnFe_2O_4$—$Fe_2O_3$ magnetic nanocomposite with mass ratio 9 to 1 (abbreviation: BOC-MFO (10%)), which has the nanosheet morphology and mesoporous in its structure, demonstrated 82.5% efficiency after 120 min illumination for 15 mg/L ofloxacin with initial pH=6 and loading 1 g/L. Moreover, remediation (adsorption+degradation) at pH=3, catalyst loading=2 g/L and pollutant concentration=15 mg/L was obtained 99.8% in the degradation of OFL. The photocatalyst efficiency was changed with changing pH, photocatalyst loading and initial concentration of pollutant.

According to the present invention, commercial applications of the present invention are disclosed. Generally, photocatalysts have many applications in many fields that some of them are: environmental remediation, conversion of harmful gases, renewable energies (solar energy absorption and hydrogen production) and polymerization of various compounds. Regarding the environmental challenges related to water pollutions and the high importance of its remediation, this invention could be used in the post-treatment part of the hospital wastewater, pharmaceutical industries, urban wastewater treatment systems, water treatment, textile industries and etc.

Water pollution is one of the major environmental problems today, so its remediation is one of the global priorities. However, existing treatment methods such as biological methods cannot remove resistant organic pollutants such as antibiotics. But, the photocatalytic process as an environmentally friendly and low-cost technique can be prominent. In this technique, unlike other conventional technologies, only the use of photocatalysts and light can remove resistant and emerging organic contaminants such as antibiotics that are resistant to conventional treatment methods. Currently, the water and wastewater treatment, water purification process and post-treatment of effluents using photocatalysis process is in the early stages of the commercialization. The process of industrialization of photocatalysts depends on factors such as increasing their ability to absorb sunlight, enhancing their photocatalytic activity, and facilitating their separation from treated solutions.

In this regard, parameters such as simplicity and cost-effectiveness of the synthesis method, facilitation of intra-particle diffusion phenomena, increasing adsorption capacity, the occurrence of appropriate surface reactions and the facilitation of separation of catalysts at the end treatment process are the factors that are created the challenges of photocatalysis and should be considered in the photocatalyst design, so that researches are still continued in this field. In present invention, photocatalytic BiOCl—$Bi_{24}O_{31}Cl_{10}$/$MnFe_2O_4$—$Fe_2O_3$ (10%) nanocomposite, as a staggered heterojunction structure was successfully synthesized using sono-solvothermal. This nanocomposite with nanosheet morphology increases the light absorption range and lifetime of charge carriers produced due to intra-heterojunction and staggered heterojunction between the existing phases. Besides, due to its high specific surface area and pore volume and the existing mesoporous, mass transfer, adsorption and subsequently, photocatalytic degradation of the contaminant molecules are improved. Moreover, the nanocomposite of the present invention could be easily separated from the treated aqueous solution owing to its magnetic property.

Generally, with design the magnetic BOC-MFO with 10% MFO nanocomposite photocatalyst, it could cover the challenges as follow: (i) conformation of its high activity in the sunlight spectrum compared to pure BiOCl; (ii) facilitating intra-particle mass transfer (Step 2 of 7 steps in photocatalytic/catalytic processes) compared to pure BiOCl; (iii) increasing surface adsorption phenomenon (Step 3 of 7 steps in photocatalytic/catalytic processes) compared to pure BiOCl and BiOCl—$Bi_{24}O_{31}Cl_{10}$; (iv) improving its surface reactions as increasing the light absorption range, probably increasing quantum efficiency and reducing the recombination phenomenon (Step 4 of 7 steps in photocatalytic/catalytic processes) compared to pure BiOCl and BiOCl—$Bi_{24}O_{31}Cl_{10}$; (v) conformation of its separation facilitation from treated aqueous solution compared to pure BiOCl and BiOCl—$Bi_{24}O_{31}Cl_{10}$; (vi) its good stability after three cycles at pH=3, catalyst loading=2 g/L and pollutant concentration=15 mg/L; and (vii) remediation (adsorption+degradation) obtained: 99.8% in the degradation of a complex and emerging pollutant. So that it can be a more effective perspective to do the future investigation.

The foregoing descriptions comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method.

Many modifications and other embodiments of the invention will come to mind to one skilled in the art to which this invention pertains having the benefit of the teachings presented in the foregoing descriptions. Although specific terms may be employed herein, they are used only in generic and descriptive sense and not for purposes of limitation. Accordingly, the present invention is not limited to the specific embodiments illustrated herein. While the above is a complete description of the preferred embodiments of the invention, various alternatives, modifications, and equivalents may be used. Therefore, the above description and the examples should not be taken as limiting the scope of the invention, which is defined by the appended claims.

What is claimed is:

1. A method of preparing a semiconductor photocatalyst, comprising:
   preparing a mixed phase of $MnFe_2O_4$—$Fe_2O_3$; and
   reacting said mixed phase with a $BiOCl$—$Bi_{24}O_{31}Cl_{10}$ precursor phase, to form a staggered multi-heterojunction structure of $BiOCl$—$Bi_{24}O_{31}Cl_{10}/MnFe_2O_4$—$Fe_2O_3$ (BOC-MFO nanocomposites) semiconductor photocatalyst.

2. The method of preparing a semiconductor photocatalyst of claim 1, wherein a solar light is activated on the final produced semiconductor photocatalyst to convert the semiconductor photocatalyst for use in pharmaceutical effluents remediation.

3. The method of preparing a semiconductor photocatalyst of claim 2, wherein the pharmaceutical effluents remediation includes ofloxacin antibiotic.

4. The method of preparing a semiconductor photocatalyst of claim 1, wherein the staggered multi-heterojunction structure of $BiOCl$—$Bi_{24}O_{31}Cl_{10}/MnFe_2O_4$—$Fe_2O_3$ (BOC-MFO) is in the form of composite nanosheets.

5. The method of preparing a semiconductor photocatalyst of claim 1, wherein the staggered multi-heterojunction structure of $BiOCl$—$Bi_{24}O_{31}Cl_{10}/MnFe_2O_4$—$Fe_2O_3$ (BOC-MFO) is of at least one of the weight ratios of 9:1, 4:1, 7:3 or 3:2.

6. The method of preparing a semiconductor photocatalyst of claim 1, wherein the staggered multi-heterojunction structure of $BiOCl$—$Bi_{24}O_{31}Cl_{10}/MnFe_2O_4$—$Fe_2O_3$ (BOC-MFO) is synthesized through sono-solvothermal method.

7. The method of preparing a semiconductor photocatalyst of claim 1, further comprising:
   a) preparing a mixed phase of $MnFe_2O_4$—$Fe_2O_3$;
   b) dispersing a predefined amount of $BiOCl$—$Bi_{24}O_{31}Cl_{10}$ precursor phase in a solvent using ultrasound waves;
   c) dispersing a predefined amount of first mixed phase in a mixture obtained at step (b) using ultrasound waves;
   d) heating a mixture obtained at step (c) in an autoclave for sono-solvothermal reaction;
   e) cooling the heated mixture of step (d) at room temperature;
   f) filtering and washing a precipitate of step (e) using deionized water, and
   g) drying a mixture of step (f) to obtain $BiOCl$—$Bi_{24}O_{31}Cl_{10}/MnFe_2O_4$—$Fe_2O_3$ semiconductor photocatalyst.

8. The method of preparing a semiconductor photocatalyst of claim 1, wherein the mixed phase of $MnFe_2O_4$—$Fe_2O_3$ is prepared during sono-precipitation, aging combined with ultrasound, reflux and calcination steps, respectively.

9. The method of claim 8, wherein the mixed phase of $MnFe_2O_4$—$Fe_2O_3$ is prepared using a process comprising the steps of:
   (i) dissolving a stoichiometric quantity of $Mn(NO_3)_2 \cdot 4H_2O$ and $Fe(NO_3)_3 \cdot 9H_2O$ in 400 mL deionized water;
   (ii) adding a precipitate agent to a mixture of step (i) while subjecting to ultrasonic irradiation;
   (iii) continuing the addition of the precipitate agent until pH reaches a range of 11-12 for sono-precipitation;
   (iv) subjecting a mixture of step (iii) to ultrasonic irradiation;
   (v) refluxing a mixture of step (iv);
   (vi) filtering and washing a mixture of step (v) using deionized water;
   (vii) drying a mixture of step (vi), and
   (viii) calcining the dried mixture of step (vii) to form the mixed phase $MnFe_2O_4$—$Fe_2O_3$ as intra-heterojunction.

10. The method of claim 9, wherein the precipitate agent is 2M NaOH.

11. The method of claim 9, wherein the ultrasound conditions for sono-precipitation step are: power=200 W; temperature=50-70° C.; and using probe typed ultrasound with frequency at about 20 kHz.

12. The method of claim 9, wherein the reflux conditions are: temperature=100° C.;
   and time=2 hours.

13. The method of claim 1, wherein the BOC-MFO nanocomposites are prepared using a process comprising the steps of:
   (i) sonicating, a certain amount of BOC precursor in weighed ratios of BOC to MFO in a solvent at a specified power and time to obtain a suspended mixture;
   (ii) adding an appropriate value of as-prepared MFO to the above suspended mixture with ultrasound assisted dispersion at a specified power and time to obtain a mixture;
   (iii) transferring the obtained mixture obtained in (ii) to a Teflon-lined stainless steel autoclave reactor and solvothermally heating at a specified temperature and time to form a precipitate; and
   (iv) cooling the precipitate naturally to the ambient temperature, filtrating and washing the preciptate by deionized water for several times and drying in an oven at 110° C. for 12 hours.

14. The method of claim 13, wherein step (i) conditions are: the amount of solvent=70 mL; power of sonication=200 W; time of sonication=30 minutes; temperature=25° C.; and using probe typed ultrasound with frequency at about 20 kHz.

15. The method of claim 13, wherein step (ii) conditions are: power of sonication=200 W; time of sonication=1 hour; temperature=25° C.; and using probe typed ultrasound with frequency at about 20 kHz.

16. The method of claim 13, wherein step (iii) conditions are: temperature=150° C.; and time=12 hours.

17. The method of preparing a semiconductor photocatalyst of claim 1, wherein there are the BET surface area and total pore volume more than of 160 $m^2/g$ and 0.5 $cm^3/g$, respectively for the semiconductor photocatalyst.

18. The method of preparing a semiconductor photocatalyst of claim 1, wherein the size distribution of pores is in the range of 2.5-50 nm which has meso-pores into its structure for the semiconductor photocatalyst.

19. The method of preparing a semiconductor photocatalyst of claim 1, having a nanosheet morphology, with an average sheet thickness of about 19.7 nm.

20. The method of preparing a semiconductor photocatalyst of claim 1, having 99.8% remediation under the conditions as follow: antibiotic concentration: 15 mg/L; semiconductor dosage: 2 mg/L; pH of solution: 3; and under 120 minutes of simulated solar light irradiation.

* * * * *